(12) United States Patent  
Houjou

(10) Patent No.: US 7,876,345 B2
(45) Date of Patent: Jan. 25, 2011

(54) INK SET AND IMAGE FORMING APPARATUS AND METHOD

(75) Inventor: Hiroaki Houjou, Ashigarakami-gun (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 741 days.

(21) Appl. No.: 11/847,409

(22) Filed: Aug. 30, 2007

(65) Prior Publication Data

US 2008/0055385 A1 Mar. 6, 2008

(30) Foreign Application Priority Data

Sep. 4, 2006 (JP) ............................. 2006-239333

(51) Int. Cl.
*B41J 2/325* (2006.01)
*C09D 11/02* (2006.01)

(52) U.S. Cl. .......................................... 347/213; 524/1
(58) Field of Classification Search .................. 347/213; 524/1
See application file for complete search history.

(56) References Cited

U.S. PATENT DOCUMENTS 7,762,657 B2 * 7/2010 Tokita et al. .................. 347/96
2006/0256175 A1 * 11/2006 Kanaya .......................... 347/95

FOREIGN PATENT DOCUMENTS

JP 2006-083277 A 3/2006

* cited by examiner

*Primary Examiner*—Daniel Petkovsek
(74) *Attorney, Agent, or Firm*—Buchanan Ingersoll & Rooney PC

(57) ABSTRACT

The ink set includes: a first liquid which contains a coloring material, a polymer, and a dispersion medium composed of water and water-soluble solvent, the coloring material and the polymer being dispersed in the dispersion medium, the coloring material having properties such that when dispersed in an aqueous coloring material solution, a volume-average particle size of the coloring material is changed along with a pH change of the aqueous coloring material solution, the polymer having properties such that when dispersed in an aqueous polymer solution, a volume-average particle size of the polymer is changed along with a pH change of the aqueous polymer solution; and a second liquid which changes pH of the first liquid, wherein a condition of $|\alpha-\beta 1|\geq|\alpha-\beta 2|$ is satisfied, where $\alpha$ is pH of the first liquid before the first liquid is subjected to a pH change caused by the second liquid, $\beta 1$ is pH of the aqueous coloring material solution at which the volume-average particle size of the coloring material reaches 1000 nm along with the pH change of the aqueous coloring material solution, and $\beta 2$ is pH of the aqueous polymer solution at which the volume-average particle size of the polymer reaches 1000 nm along with the pH change of the aqueous polymer solution.

8 Claims, 6 Drawing Sheets

FIG. 6

| | INK | | TREATMENT LIQUID | | pH DIFFER-ENTIAL | RECORDING METHOD | BLEED-ING | NON-UNIFORM-ITIES | IMAGE DENSITY | TRANSFER CHARACTER-ISTICS |
|---|---|---|---|---|---|---|---|---|---|---|
| | INK No. | pH | LIQUID No. | pH | | | | | | |
| PRACTICAL EXAMPLE 3 | INK 3 | 8.5 | LIQUID 1 | 3.5 | 5.0 | DIRECT | B | B | B | / |
| PRACTICAL EXAMPLE 6 | INK 3 | 8.5 | LIQUID 1 | 3.5 | 5.0 | INTERMEDIATE TRANSFER | A | B | B | A |
| PRACTICAL EXAMPLE 7 | INK 7 | 9.5 | LIQUID 1 | 3.5 | 6.0 | DIRECT | B | B | B | / |
| PRACTICAL EXAMPLE 8 | INK 7 | 9.5 | LIQUID 1 | 3.5 | 6.0 | INTERMEDIATE TRANSFER | B | B | B | A |
| COMPARATIVE EXAMPLE 7 | INK 8 | 10.0 | LIQUID 1 | 3.5 | 6.5 | DIRECT | C | C | B | / |
| COMPARATIVE EXAMPLE 8 | INK 8 | 10.0 | LIQUID 1 | 3.5 | 6.5 | INTERMEDIATE TRANSFER | C | B | B | A |
| PRACTICAL EXAMPLE 9 | INK 3 | 8.5 | LIQUID 2 | 5.5 | 3.0 | DIRECT | B | B | B | / |
| PRACTICAL EXAMPLE 10 | INK 3 | 8.5 | LIQUID 2 | 5.5 | 3.0 | INTERMEDIATE TRANSFER | B | B | B | A |
| COMPARATIVE EXAMPLE 9 | INK 3 | 8.5 | LIQUID 3 | 6.0 | 2.5 | DIRECT | C | B | B | / |
| COMPARATIVE EXAMPLE 10 | INK 3 | 8.5 | LIQUID 3 | 6.0 | 2.5 | INTERMEDIATE TRANSFER | C | B | B | B |

INK SET AND IMAGE FORMING APPARATUS AND METHOD

BACKGROUND OF THE INVENTION

1. Field of the Invention

The present invention relates to an ink set, and an image forming apparatus and method, and more particularly, to an ink set including two liquids, and an image forming apparatus and method using this ink set.

2. Description of the Related Art

With the rapid progress of inkjet technology and digital cameras and other digital imaging technology in recent years, it has become possible to obtain high-quality photographic prints which surpass silver halide photographs, easily, even in a general domestic situation. On the other hand, inkjet technology has started to be adapted for and applied to many diverse fields, such as industrial printing. However, in the field of industrial printing, it is essential to achieve high-speed operation, from the viewpoint of productivity, but there have been no ink and image recording method which enables high-quality prints of the level of a silver halide print to be produced at high speed. Therefore, research has been started into various recording methods for providing images of high quality at high speed, and one of these methods involves the use of a responsive ink set constituted of a combination of a treatment liquid and an ink liquid. This responsive ink set enables the bleeding of ink (ink bleeding) to be reduced.

Furthermore, an image forming apparatus has been known which adopts a so-called intermediate transfer system, in which an image is formed on an intermediate transfer body, and the image formed on the intermediate transfer body is then transferred to a recording medium. In the image forming apparatus of intermediate transfer type, it has been difficult to achieve high quality on the intermediate transfer body as well as achieving good transfer characteristics. This is because a liquid flow is created on the intermediate transfer body and the image quality is liable to decline as a result of this flow. In view of these circumstances, various methods have been proposed in order to achieve good image quality on the intermediate transfer body.

Japanese Patent Application Publication No. 2001-30616 and Japanese Patent Application Publication No. 2002-52804 disclose polymer particles which tend to be subjected to a reaction with polyvalent metal salt contained in a treatment liquid, and which have film forming properties, whereby high-resolution and high-quality images can be obtained. Japanese Patent Application Publication No. 2003-82265 discloses a method in which coloring material and polymer particles are aggregated by means of a polyvalent metal salt, which is similar to the one disclosed in Japanese Patent Application Publication Nos. 2001-30616 and 2002-52804, or a poly allylamine, and thereby an image is formed on an intermediate transfer body. In this method, the aggregating force of the coloring material aggregate is increased. Furthermore, Japanese Patent Application Publication No. 2006-83277 discloses an ink containing polymer particles which are self-dispersible in water and whose the diameter varies with the characteristics (the pH or the conductivity) of the aqueous solution. The aggregation of coloring material in this ink is promoted by means of the aggregation of the polymer particles due to a change in the pH of the ink.

However, although Japanese Patent Application Publication No. 2001-30616 and Japanese Patent Application Publication No. 2002-52804 provide effective methods for obtaining an image with high-resolution and high-quality up to a certain degree, they are problematic in that the ink bleeding is liable to occur in image border sections, and that density non-uniformities are liable to occur in the case of a solid image. The reason for these problems are considered to be as follows. If the aggregating force of the polyvalent metal salt is too strong, then in the initial stage of reaction, an aggregate of the pigment (coloring material) and polymer particles is formed only at the contact interface between the treatment liquid and the ink. This aggregate formed at the contact interface then prevents the pigment (coloring material) and the polymer particles contained in the ink from diffusing into the treatment liquid, and at the same time, prevents the polyvalent metal salt contained in the treatment liquid from diffusing into the ink, resulting in the nonuniform progress of the reaction within an image. Consequently, there exist portions where the aggregating action acts too strongly and portions where the reaction is insufficient.

The technology disclosed in Japanese Patent Application Publication No. 2003-82265 is effective, when an image of high image density in which the ink bleeding is restricted to some extent is formed by intermediate transfer method on the recording medium which is a permeable paper such as a normal paper. However, since this technology utilizes the aggregating action similar to the one as in Japanese Patent Application Publication Nos. 2001-30616 and 2002-52804, then non-uniformities of the reaction occur in the image forming region, and therefore variations in the aggregating force are liable to arise. Consequently, transfer non-uniformities and transfer defects occur, and there is a possibility that the quality of the image formed on the recording medium will be seriously impaired. Furthermore, since unreacted coloring material is liable to remain, then the coloring material flows (moves) on the transfer body, and the image quality at the stage of forming an image on the intermediate transfer body cannot be regarded as adequate.

Moreover, Japanese Patent Application Publication No. 2006-83277 indeed has the effect of promoting the aggregation of the coloring material due to the aggregating effect of the polymer particles as a result of the change in the pH of the ink, but, depending on the form (or extent of aggregation) of aggregation of the polymer particles, a problem may arise in that satisfactory effects of achieving high image quality such as effects of the suppression of the ink bleeding or the suppression of density non-uniformities, or the like cannot be obtained.

SUMMARY OF THE INVENTION

The present invention has been contrived in view of these circumstances, an object thereof being to provide an ink set, and an image forming apparatus and method whereby a high-quality image which is free of ink bleeding can be obtained, while being able to prevent density non-uniformities in solid image regions. Moreover, a further object of the present invention is to provide an ink set, and an image forming apparatus and method, whereby it is possible to prevent transfer defects and transfer non-uniformities in an intermediate transfer type of recording method, and it is also possible to obtain a high-quality image which is free of ink bleeding, as well as preventing density non-uniformities in solid image regions.

In order to attain the aforementioned object, the present invention is directed to an ink set including: a first liquid which contains a coloring material, a polymer, and a dispersion medium composed of water and water-soluble solvent, the coloring material and the polymer being dispersed in the dispersion medium, the coloring material having properties such that when dispersed in an aqueous coloring material solution, a volume-average particle size of the coloring material is changed along with a pH change of the aqueous coloring material solution, the polymer having properties such that when dispersed in an aqueous polymer solution, a volume-average particle size of the polymer is changed along with a pH change of the aqueous polymer solution; and a second liquid which changes pH of the first liquid, wherein a condition of $|\alpha-\beta1| \geq |\alpha-\beta2|$ is satisfied, where $\alpha$ is pH of the first liquid before the first liquid is subjected to a pH change caused by the second liquid, $\beta1$ is pH of the aqueous coloring material solution at which the volume-average particle size of the coloring material reaches 1000 nm along with the pH change of the aqueous coloring material solution, and $\beta2$ is pH of the aqueous polymer solution at which the volume-average particle size of the polymer reaches 1000 nm along with the pH change of the aqueous polymer solution.

In order to attain the aforementioned object, the present invention is also directed to an ink set including: a first liquid which contains a coloring material, a polymer, and a dispersion medium composed of water and water-soluble solvent, the coloring material and the polymer being dispersed in the dispersion medium, the coloring material having properties such that when dispersed in an aqueous coloring material solution, a zeta potential of the coloring material is changed along with a pH change of the aqueous coloring material solution, the polymer having properties such that when dispersed in an aqueous polymer solution, a zeta potential of the polymer is changed along with a pH change of the aqueous polymer solution; and a second liquid which changes pH of the first liquid, wherein a condition of $|\alpha-\gamma1| \geq |\alpha-\gamma2|$ is satisfied, where $\alpha$ is pH of the first liquid before the first liquid is subjected to a pH change caused by the second liquid, $\gamma1$ is pH of the aqueous coloring material solution at which an absolute value of the zeta potential of the coloring material is reduced to 5 mV along with the pH change of the aqueous coloring material solution, and $\gamma2$ is pH of the aqueous polymer solution at which an absolute value of the zeta potential of the polymer is reduced to 5 mV along with the pH change of the aqueous polymer solution.

Here, the first liquid contains a coloring material (e.g., a pigment) and a polymer (hereinafter, also referred to as "polymer particles"), and $\beta1$ is pH of the aqueous coloring material solution (in which only the coloring material is dispersed) at which the volume-average particle size of the coloring material reaches 1000 nm along with the pH change of the aqueous coloring material solution, and $\beta2$ is pH of the aqueous polymer solution (in which only the polymer is dispersed) at which the volume-average particle size of the polymer reaches 1000 nm along with the pH change of the aqueous polymer solution.

In this aspect of the present invention, since the first liquid (ink) contains the coloring material and the polymer that are subjected to aggregation by means of the second liquid (treatment liquid), then it is possible to obtain an image of high quality, which is free of ink bleeding, as well as being able to prevent density non-uniformities in solid image regions. Furthermore, additional beneficial effects are obtained in that fixing characteristics in the recorded image can be enhanced, and in the case of an intermediate transfer type of recording system, transfer defects and transfer non-uniformities can be prevented and the beneficial effects described above can be obtained to the extent as in the direct recording system.

A reason why these beneficial effects are obtained is considered to be because in the initial stage where the pH of the ink declines when the treatment liquid and the ink come into contact with each other and mix together, aggregation of the polymer particles occurs before aggregation of the coloring material, and therefore the coloring material becomes caught up in the aggregation of the polymer, and the coloring material also undergoes aggregation, with a greater aggregating force and at a faster aggregation speed than in the case of aggregation of the coloring material alone. The reason why an action occurs in which the polymer catches up the coloring material and enhances the aggregation of the coloring material is considered to be because, when the polymer particles aggregate, they are liable to create a state approximate to that of a film having a mesh stricture in which molecule chains are intertwined with each other. Due to this kind of action, it is possible to promote aggregation of the coloring material further, and to thereby cause the reaction (aggregation) to proceed without giving rise to any unreacted coloring material. Consequently, reaction non-uniformities do not occur within the image, and it is possible to suppress effects caused by reaction non-uniformities, such as ink bleeding due to permeation of unreacted coloring material into the recording medium, or density non-uniformities within solid image regions. As a result, an image of high quality can be obtained. Moreover, an intermediate transfer type of recording method is beneficial in improving image quality by further suppressing ink bleeding, in comparison with a direct recording system, since there is no permeation of the solvent component into the recording medium.

Furthermore, even if the treatment liquid contains a polyvalent metal salt having a strong aggregating force, it is still possible to suppress reaction non-uniformities inside the image caused by the strong aggregation characteristics of the polyvalent metal salt, since the aggregation of the polymer particles occurs before the aggregation of the coloring material. Therefore, even in cases where the treatment liquid contains a polyvalent metal salt or poly allylamine, it is still possible to obtain an image of high density and high quality, which is free of ink bleeding or density non-uniformities.

Moreover, the structure of the aggregate formed when the present invention is carried out is considered to be such that the coloring material aggregates and the polymer aggregates are distributed uniformly in the whole aggregate, since the coloring material aggregates while the coloring material is caught up in the aggregation of the polymer particles. Consequently, the bonding force between the coloring material aggregates is enhanced by the bonding action of the polymer aggregate situated between the coloring material aggregates, and hence a beneficial effect is obtained in improving the internal aggregating force of the aggregate material (aggregate particle) as a whole. In particular, it is possible further to improve these beneficial effects by removing the solvent from the aggregate (aggregate particle), or by fusing (softening and combining together) the polymer particles incorporated in the aggregate by heating. Furthermore, this is also thought to be the reason why it is possible to prevent transfer defects or transfer non-uniformities in the transfer of an image composed of the aggregate particles deposited on an intermediate transfer body in an intermediate transfer type of recording method. More specifically, since an aggregating force sufficient for transfer can be obtained, then it is possible to prevent transfer defects or transfer non-uniformities.

In the above aspects of the present invention, it is possible to obtain an image of high quality which is free of ink bleeding, as well as preventing density non-uniformities in solid image regions, provided that the first liquid containing the coloring material and the polymer, the aqueous coloring material solution in which only the coloring material is dispersed, and the aqueous polymer solution in which only the polymer is dispersed, have the relationship of $|\alpha-\beta1| \geq |\alpha-\beta2|$, or $|\alpha-\gamma1| \geq |\alpha-\gamma2|$. Moreover, in the case of an intermediate transfer type of recording method also, it is possible to prevent transfer defects and transfer non-uniformities, as well as obtaining the aforementioned beneficial effects to the extent as in a direct recording method.

In the present invention, the aggregating characteristics of the polymer particles complement the aggregating characteristics of the coloring material, and therefore it is not necessary for the coloring material itself to have strong aggregating characteristics, and the coloring material can be chose from a variety of substances.

Preferably, the coloring material and the polymer contained in the first liquid form aggregate particles along with a pH change of the first liquid caused by the second liquid; and when the pH of the first liquid becomes β1, the aggregate particles having diameters of not less than 500 nm account for not less than 80 vol % of all of the aggregate particles.

In this aspect of the present invention, since the aggregate particles having diameters equal to or greater than 500 nm amounts to 80 vol % or above of all of the aggregate particles when the pH of the first liquid becomes β1, then it is possible to obtain an image of high quality which is free of ink bleeding and it is possible to prevent density non-uniformities.

Preferably, one of the first liquid and the second liquid is alkaline, and the other is acid.

In this aspect of the present invention, since one liquid of the first liquid and the second liquid in the ink set is alkaline, and the other is acid, then it is possible to cause the coloring material and polymer particles in the first liquid (ink) to aggregate satisfactorily, by means of the second liquid (treatment liquid).

Preferably, a pH differential between the first liquid and the second liquid is not less than 3.0 and not greater than 6.0.

In this aspect of the present invention, since the pH differential between the first liquid and the second liquid in the ink set is equal to or greater than 3.0 and equal to or less than 6.0, then it is possible to make the coloring material and the polymer particles in the first liquid (ink) aggregate more satisfactorily, by means of the second liquid (treatment liquid).

In order to attain the aforementioned object, the present invention is also directed to an image forming apparatus including: a second liquid application unit which applies the second liquid of the above-described ink set, on a recording medium; and a first liquid application unit which applies the first liquid of the above-described ink set, on the second liquid having been applied on the recording medium.

Moreover, the present invention is also directed to an image forming apparatus including: a second liquid application unit which applies the second liquid of the above-described ink set, on an intermediate transfer body; a first liquid application unit which applies the first liquid of the above-described ink set, on the second liquid having been applied on the intermediate transfer body; and a transfer unit which transfers an image composed of the coloring material, from the intermediate transfer body to a recording medium.

In these aspects of the present invention, it is possible to obtain an image of high quality which is free of ink bleeding, as well as preventing density non-uniformities in solid image regions. Moreover, it is also possible to prevent transfer defects and transfer non-uniformities in an intermediate transfer type of image forming apparatus.

The method of applying the second liquid (treatment liquid) by means of the second liquid (treatment liquid) application unit according to the above-described aspects of the present invention is not limited to ejecting the second liquid in the form of droplets by means of an inkjet type of ejection head, and the second liquid may also be applied on the intermediate transfer body by coating (in other words, a mode is also possible in which the intermediate transfer body is coated with the second liquid). Moreover, for the first liquid (ink) application unit, it is suitable to use an inkjet type of ejection head which ejects the first liquid (ink) on the basis of image information for printing (print data). Furthermore, in the present specification, "recording medium" is not limited to a paper used in a general apparatus, and it may also include cloth, metal, sheet material, glass, ceramic, wood, plastic film, leather, or the like.

In order to attain the aforementioned object, the present invention is also directed to an image forming method of forming an image on a recording medium, including the steps of: applying the second liquid of the above-described ink set, on the recording medium; and then applying the first liquid of the above-described ink set, on the second liquid having been applied on the recording medium, so that the coloring material and the polymer dispersed in the first liquid are subjected to aggregation to form the image on the recording medium.

Moreover, the present invention is also directed to an image forming method of forming an image on a recording medium, including the steps of: applying the second liquid of the above-described ink set, on an intermediate transfer body; then applying the first liquid of the above-described ink set, on the second liquid having been applied on the intermediate transfer body, so that the coloring material and the polymer in the first liquid are subjected to aggregation to form the image on the intermediate transfer body; and then transferring the image from the intermediate transfer body to the recording medium.

In these aspects of the present invention, it is possible to obtain an image of high quality which is free of ink bleeding, as well as preventing density non-uniformities in solid image regions. Moreover, it is also possible to prevent transfer defects and transfer non-uniformities in an intermediate transfer type of image forming method.

According to the present invention, it is possible to provide an ink set, and an image forming apparatus and method whereby a high-quality image which is free of ink bleeding can be obtained, while being able to prevent density non-uniformities in a solid image region.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 6 is a diagram showing evaluation results.

DETAILED DESCRIPTION OF THE PREFERRED EMBODIMENTS

Figure 1:
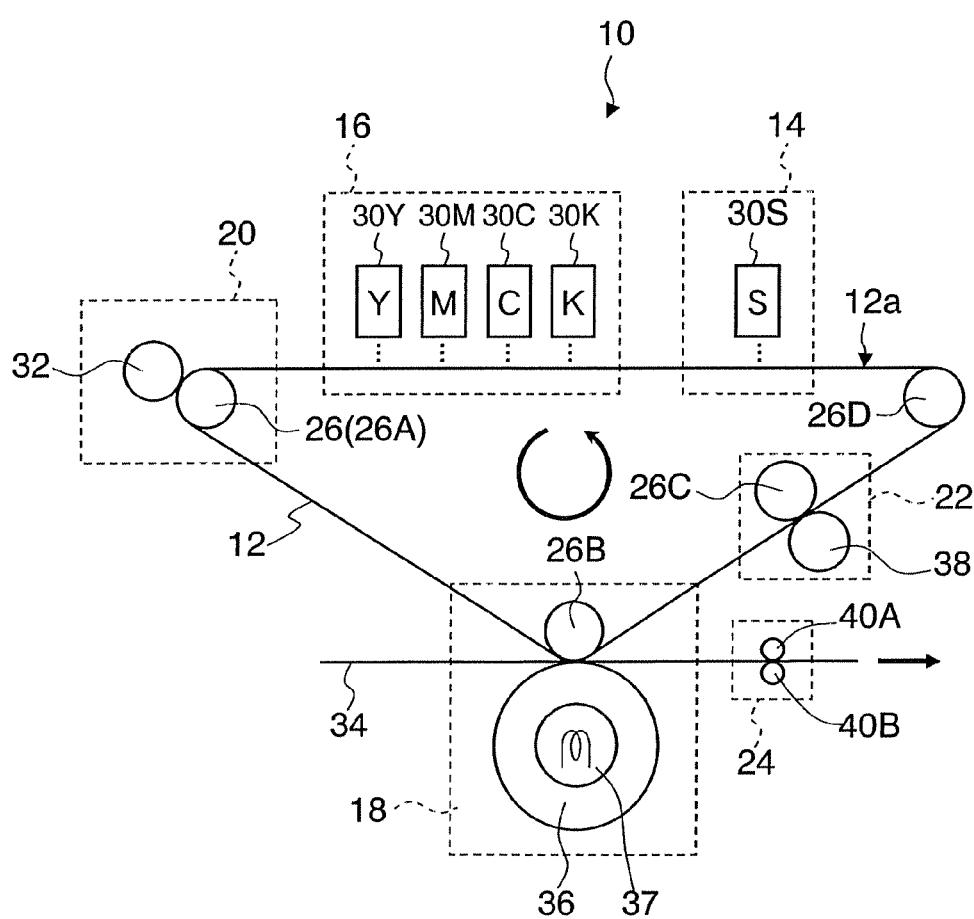
FIG. 1 is a general schematic drawing showing a general view of an inkjet recording apparatus according to an embodiment of the present invention.

The ink set (a first liquid (ink) and a second liquid (treatment liquid)) according to an embodiment of the present invention is constituted at least of a first liquid in which at least a coloring material and polymer particles are dispersed in a dispersion medium composed of water and water-soluble solvent, and a second liquid for changing the pH of the first liquid. The coloring material usable in this embodiment of the present invention has properties whereby the volume-average particle size of the coloring material is changed along with a pH change of an aqueous solution of coloring material in which only the coloring material is dispersed, and moreover, the polymer particles usable in the present invention has properties whereby the volume-average particle size of the polymer particles is changed along with a pH change of an aqueous solution of polymer in which only the polymer particles are dispersed. Moreover, the inequality equation of $|\alpha-\beta1| \geq |\alpha-\beta2|$ is satisfied in this embodiment of the present invention, where $\alpha$ is the pH value of the first liquid before pH change (before the first liquid is subjected to a change in pH due to a reaction with the second liquid), $\beta1$ is a pH value of the aqueous coloring material solution at which the volume-average particle size of the coloring material dispersed therein reaches 1000 nm along with the pH change of the aqueous coloring material solution, and $\beta2$ is a pH value of the aqueous polymer solution at which the volume-average particle size of the polymer particles dispersed therein reaches 1000 nm along with the pH change of the aqueous polymer solution. Furthermore, the ink set according to another embodiment of the present invention is constituted at least of a first liquid in which at least a coloring material and polymer particles are dispersed in a dispersion medium composed of water and water-soluble solvent, and a second liquid for changing the pH of the first liquid. The coloring material usable in this embodiment of the present invention has properties whereby the zeta potential of the coloring material is changed along with a pH change of an aqueous solution of coloring material in which only the coloring material is dispersed, and moreover, the polymer particles usable in the present invention has properties whereby the zeta potential of the polymer particles is changed along with a pH change of an aqueous solution of polymer in which only the polymer particles are dispersed. Moreover, the inequality equation of $|\alpha-\gamma1| \geq |\alpha-\gamma2|$ is satisfied in this embodiment of the present invention, where $\alpha$ is the pH value of the first liquid before pH change (before the first liquid is subjected to a change in pH due to a reaction with the second liquid), $\gamma1$ is a pH value of the aqueous coloring material solution at which an absolute value of the zeta potential of the coloring material dispersed therein is reduced to 5 mV along with the pH change of the aqueous coloring material solution, and $\gamma2$ is a pH value of the aqueous polymer solution at which an absolute value of the zeta potential of the polymer particles dispersed therein is reduced to 5 mV along with the pH change of the aqueous polymer solution. More specifically, the term "an absolute value of the zeta potential is reduced to 5 mV" indicates that the zeta potential of the coloring material or the polymer particle reaches −5 mV in the case where the coloring material or the polymer particle is anionic, and on the other hand, this term indicates that the zeta potential of the coloring material or the polymer particles reaches 5 mV in the case where the coloring material or the polymer particle is cationic.

The image forming apparatus according to an embodiment of the present invention includes a second liquid (treatment liquid) application unit (deposition unit) which applies a second liquid (treatment liquid) on a recording medium, and a first liquid (ink) application unit (deposition unit) which applies a first liquid (ink) on top of the second liquid (treatment liquid). Moreover, the image forming apparatus according to another embodiment of the present invention includes an intermediate transfer body on which an ink image is formed, a second liquid (treatment liquid) application unit (deposition unit) which applies a second liquid (treatment liquid) onto the intermediate transfer body, an ink application unit (ink deposition unit) which applies a first liquid (ink) onto the treatment liquid, and a transfer unit which transfers the ink image formed on the intermediate transfer body to a recording medium.

In the following, an image forming apparatus including an intermediate transfer body is described, but the image forming apparatus is not limited to this embodiment.

Firstly, the first liquid (ink) and the second liquid (treatment liquid) constituting the ink set according to an embodiment of the present invention are described in detail.

Ink

The ink in the present embodiment contains a coloring material, polymer particles, a water-soluble organic solvent, and water.

The coloring material in the ink may be pigment or a combination of pigment and dye. From the viewpoint of the aggregating characteristics when the ink comes into contact with the treatment liquid, a dispersed pigment in the ink is desirable for more effective aggregation. Desirable pigments include: a pigment dispersed by a dispersant, a self-dispersing pigment, a pigment in which the pigment particle is coated with a resin (hereinafter referred to as "micro-capsulated pigment"), and a polymer grafted pigment. Moreover, from the viewpoint of the aggregating characteristics of the coloring material, it is more desirable that the coloring material is modified with a carboxylic acid group having a low degree of disassociation.

There are no particular restrictions on the resin used for a micro-capsulated pigment, but desirably, it should be a compound of high molecular weight which has a self-dispersing capability and solubility in water, and contains an anionic group (acidic). Generally, it is desirable that the resin should have a number average molecular weight in the approximate range of 1,000 to 100,000, and especially desirably, in the approximate range of 3,000 to 50,000. Moreover, desirably, this resin can dissolved in an organic solvent to form a solution. By limiting the number average molecular weight of the resin to this range, it is possible to make the resin display satisfactory functions as a covering film for the pigment particle, or as a coating film in the ink composition.

The resin may itself have a self-dispersing capability or solubility, or these functions may be added or introduced. For example, it is possible to use a resin having an introduced carboxyl group, sulfonic acid group, or phosphonic acid group or another anionic group, by neutralizing with an organic amine or alkali metal. Moreover, it is also possible to use a resin into which one or two or more anionic groups of the same type or different types have been introduced. In the embodiment of the present invention, it is desirable to use a resin which has been neutralized by means of a salt and which contains an introduced carboxyl group.

There are no particular restrictions on the pigment used in the present embodiment, and specific examples of orange and yellow pigments are: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C.I. Pigment Yellow 185.

Specific examples of red and magenta pigments are: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C.I. Pigment Red 149, C. I. Pigment Red 166, C. I. Pigment Red 177, C. I. Pigment Red 178, and C.I. Pigment Red 222.

Specific examples of green and cyan pigments are: C. I. Pigment Blue 15, C. I. Pigment Blue 15:2, C. I. Pigment Blue 15:3, C. I. Pigment Blue 16, C. I. Pigment Blue 60, and C.I. Pigment Green 7.

Specific examples of a black pigment are: C.I. Pigment Black 1, C.I. Pigment Black 6, and C.I. Pigment Black 7.

The concentration of the coloring material contained in the ink in the present embodiment is set to an appropriate value in accordance with the coloring material used. The percentage of the coloring material in the ink is preferably 0.1 wt % through 40 wt %, more desirably 1 wt % through 30 wt %, and even more desirably 2 wt % through 20 wt %.

Polymer Particle

It is desirable in the present embodiment that the ink contains polymer particles that do not contain any colorant, as a component for reacting with the treatment liquid. The polymer particles can improve the image quality by strengthening the ink viscosity raising action and the aggregating action through reaction with the treatment liquid. In particular, a highly stable ink can be obtained by adding anionic polymer particles to the ink. By using the ink containing the polymer particles that produce the viscosity raising action and the aggregating action through reaction with the treatment liquid, it is possible to increase the quality of the image on the transfer body, and at the same time, depending on the type of polymer particles, the polymer particles may form a film on the recording medium, and therefore beneficial effects can be obtained in improving the wear resistance, the light resistance and the waterproofing characteristics of the image.

The method of dispersing the polymer particles in the ink is not limited to adding an emulsion of the polymer particles to the ink, and the resin may also be dissolved, or included in the form of a colloidal dispersion, in the ink.

The polymer particles may be dispersed by using an emulsifier, or the polymer particles may be dispersed without using any emulsifier. For the emulsifier, a surface active agent of low molecular weight is generally used, and it is also possible to use a surface active agent of high molecular weight. It is also desirable to use a capsule type of polymer particles having an outer shell composed of acrylic acid, methacrylic acid, or the like (core-shell type of polymer particles in which the composition is different between the core portion and the outer shell portion).

The polymer particles dispersed without any surface active agent of low molecular weight are known as the soap-free latex, which includes polymer particles with no emulsifier or a surface active agent of high molecular weight. For example, the soap-free latex includes polymer particles that use, as an emulsifier, the above-described polymer having a water-soluble group, such as a sulfonic acid group or carboxylic acid group (a polymer with a grafted water-soluble group, or a block polymer obtained from a monomer having a water-soluble group and a monomer having an insoluble part).

It is especially desirable in the present embodiment to use the soap-free latex compared to other type of resin particles obtained by polymerization using an emulsifier, since there is no possibility that the emulsifier inhibits the aggregating reaction and film formation of the polymer particles, or that the free emulsifier moves to the surface after film formation of the polymer particles and thereby degrades the adhesive properties between the recording medium and the ink aggregate in which the coloring material and the polymer particles are combined.

Examples of the resin component added as the resin particles to the ink include: an acrylic resin, a vinyl acetate resin, a styrene-butadiene resin, a vinyl chloride resin, an acryl-styrene resin, a butadiene resin, and a styrene resin.

In order to make the polymer particles have high speed aggregation characteristics, it is desirable that the polymer particles contain a carboxylic acid group having a low degree of disassociation. Since the carboxylic acid group is readily affected by change of pH, then the polymer particles containing the carboxylic acid group easily change the state of the dispersion and have high aggregation characteristics.

The change in the dispersion state of the polymer particles caused by change in the pH can be adjusted by means of the component ratio of the polymer particle having a carboxylic acid group, such as ester acrylate, or the like, and it can also be adjusted by means of an anionic surfactant which is used as a dispersant.

Desirably, the resin constituting the polymer particles is a polymer that has both of a hydrophilic part and a hydrophobic part. By incorporating a hydrophobic part, the hydrophobic part is oriented toward to the inner side of the polymer particle, and the hydrophilic part is oriented efficiently toward the outer side, thereby having the effect of further increasing the change in the dispersion state caused by change in the pH of the liquid. Therefore, aggregation can be performed more efficiently.

Examples of commercially available resin emulsion include: Joncryl 537 and 7640 (styrene-acrylic resin emulsion, manufactured by Johnson Polymer), Microgel E-1002 and E-5002 (styrene-acrylic resin emulsion, manufactured by Nippon Paint), Voncoat 4001 (acrylic resin emulsion, manufactured by Dainippon Ink and Chemicals), Voncoat 5454 (styrene-acrylic resin emulsion, manufactured by Dainippon Ink and Chemicals), SAE-1014 (styrene-acrylic resin emulsion, manufactured by Zeon Japan), Jurymer ET-410 (acrylic resin emulsion, manufactured by Nihon Junyaku), Aron HD-5 and A-104 (acrylic resin emulsion, manufactured by Toa Gosei), Saibinol SK-200 (acrylic resin emulsion, manufactured by Saiden Chemical Industry), and Zaikthene L (acrylic resin emulsion, manufactured by Sumitomo Seika Chemicals). However, the resin emulsion is not limited to these examples.

The weight ratio of the polymer particles to the pigment is desirably 2:1 through 1:10, and more desirably 1:1 through 1:3. If the weight ratio of the polymer particles to the pigment is less than 2:1, then there is no substantial improvement in the aggregating force of the aggregate formed by the cohesion of the polymer particles. On the other hand, if the weight ratio of the polymer particles to the pigment is greater than 1:10, the viscosity of the ink becomes too high and the ejection characteristics, and the like, deteriorate.

From the viewpoint of the adhesive force after the cohesion, it is desirable that the molecular weight of the polymer particles added to the ink is no less than 5,000. If it is less than 5,000, then beneficial effects are insufficient in terms of improving the internal aggregating force of the ink aggregate, achieving good fixing characteristics after transfer to the recording medium, and improving the image quality.

Desirably, the volume-average particle size of the polymer particles is in the range of 10 nm to 1 μm, more desirably, the range of 10 nm to 500 nm, even desirably 20 nm to 200 nm and particularly desirably, the range of 50 nm to 200 nm. If the particle size is equal to or less than 10 nm, then significant effects in improving the image quality or enhancing transfer characteristics cannot be expected, even if aggregation occurs. If the particle size is equal to or greater than 1 μm, then there is a possibility that the ejection characteristics from the ink head or the storage stability will deteriorate. Furthermore, there are no particular restrictions on the volume-average particle size distribution of the polymer particles and they may have a broad volume-average particle size distribution or they may have a monodisperse volume-average particle size distribution.

Moreover, two or more types of polymer particles may be used in combination in the ink.

Examples of the pH adjuster added to the ink in the present embodiment include an organic base and an inorganic alkali base, as a neutralizing agent. In order to improve storage stability of the ink for inkjet recording, the pH adjuster is desirably added in such a manner that the ink for inkjet recording has the pH of 6 through 10.

It is desirable in the present embodiment that the ink contains a water-soluble organic solvent, from the viewpoint of preventing nozzle blockages in the ejection head due to drying. Examples of the water-soluble organic solvent include a wetting agent and a penetrating agent.

Examples of the water-soluble organic solvent in the ink are: polyhydric alcohols, polyhydric alcohol derivatives, nitrous solvents, monohydric alcohols, and sulfurous solvents. Specific examples of the polyhydric alcohols are: ethylene glycol, diethylene glycol, propylene glycol, butylene glycol, triethylene glycol, 1,5-pentane diol, 1,2,6-hexane triol, and glycerin. Specific examples of the derivatives of polyhydric alcohol are: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin. Specific examples of the nitrous solvents are: pyrrolidone, N-methyl-2-pyrrolidone, cyclohexyl pyrrolidone, and triethanol amine. Specific examples of the monohydric alcohols are: ethanol, isopropyl alcohol, butyl alcohol, benzyl alcohol, and the like. Specific examples of the sulfurous solvents are: thio diethanol, thio diglycerol, sulfolane, and dimethyl sulfoxide. Apart from these, it is also possible to use propylene carbonate, ethylene carbonate, or the like.

The ink according to the present embodiment may contain a surface active agent.

Examples of the surface active agent in the ink include: in a hydrocarbon system, an anionic surface active agent, such as a salt of a fatty acid, an alkyl sulfate ester salt, an alkyl benzene sulfonate salt, an alkyl naphthalene sulfonate salt, a dialkyl sulfosuccinate salt, an alkyl phosphate ester salt, a naphthalene sulfonate/formalin condensate, and a polyoxyethylene alkyl sulfonate ester salt; and a non-ionic surface active agent, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerin fatty acid ester, and an oxyethylene oxypropylene block copolymer. Desirable examples of the surface active agent further include: Surfynols (manufactured by Air Products & Chemicals), which is an acetylene-based polyoxyethylene oxide surface active agent, and an amine oxide type of amphoteric surface active agent, such as N,N-dimethyl-N-alkyl amine oxide.

Moreover, it is also possible to use the surface active agents cited in Japanese Patent Application Publication No. 59-157636, pages 37 to 38, and Research Disclosure No. 308119 (1989). Furthermore, it is also possible to use a fluoride type (alkyl fluoride type), or silicone type of surface active agent such as those described in Japanese Patent Application Publication Nos. 2003-322926, 2004-325707 and 2004-309806. It is also possible to use a surface tension adjuster of this kind as an anti-foaming agent; and a fluoride or silicone compound, or a chelating agent, such as ethylenediamine tetraacetic acid (EDTA), can also be used.

The surface active agent contained in the ink has beneficial effects in raising the wetting properties on the intermediate transfer body or on the treatment liquid by reducing the surface tension, and therefore the aggregating action effectively progresses due to the increase in the contact surface area between the treatment liquid and the ink.

It is desirable in the present embodiment that the ink has the surface tension of 10 mN/m through 50 mN/m; and from the viewpoint of achieving good wetting properties on the intermediate transfer body or the treatment liquid, formation of fine droplets and good ejection properties, the surface tension of the ink is more desirably 15 mN/m through 45 mN/m.

It is desirable in the present embodiment that the ink has the viscosity of 1.0 mPa·s through 20.0 mPa·s.

Apart from the foregoing, according to requirements, it is also possible that the ink contains a pH buffering agent, an anti-oxidation agent, an antibacterial agent, a viscosity adjusting agent, a conductive agent, an ultraviolet absorbing agent, or the like.

Treatment Liquid

It is desirable in the present embodiment that the treatment liquid has effects of generating aggregation of the coloring material (e.g., a pigment) and the polymer particles contained in the ink by producing a pH change in the ink when coming into contact with the ink.

Specific examples of the contents of the treatment liquid are: polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, cumaric acid, thiophene carboxylic acid, nicotinic acid, derivatives of these compounds, and salts of these.

It is desirable in the present embodiment that the treatment liquid is added with an additive such as polyvalent metal salt and poly allylamine. The treatment liquid may be added with a single type of the additive, or may be added two or more types of the additives.

From the viewpoint of the pH aggregating characteristics with respect to the ink, it is desirable in the present embodiment that the pH of the treatment liquid is adjusted to 1 through 6, more desirably 2 through 5, and further more desirably 3 through 5.

It is desirable in the present embodiment that the added amount in the treatment liquid of the agent for aggregating the pigment and the polymer particles in the ink is no less than 0.01 wt % and no more than 20 wt % with respect to the total weight of the liquid. If the added amount is less than 0.01 wt %, then when the treatment liquid and the ink come into contact, the concentration diffusion may not progress satisfactorily and the aggregating action caused by the pH change may not occur satisfactorily. On the other hand, if the added amount is greater than 20 wt %, then the ejection characteristics from the ejection head may deteriorate.

It is desirable in the present embodiment that the treatment liquid contains an organic solvent soluble to water and other additives, from the viewpoint of preventing nozzle blockages in the ejection head due to drying. Examples of the organic solvent soluble to water and other additives include a wetting agent and a penetrating agent.

In the present embodiment, a single type of the organic solvent soluble to water and other additives may be used independently, or two or more types of the organic solvent soluble to water and other additives may be mixed and used together. The content ratio of the organic solvent soluble to water and other additives to the total weight of the treatment liquid is desirably no more than 60 wt %. If the content ratio is greater than 60 wt %, then the viscosity of the treatment liquid may increase and the ejection characteristics from the ejection head may deteriorate.

It is also possible to add a resin component to the treatment liquid in order to improve the fixing characteristics. The resin component may be any resin that has stable storage characteristics, and that does not impair the ejection characteristics from the ejection head if the treatment liquid is ejected in the form of droplets from the ejection head, and it is possible freely to choose a water-soluble resin, resin emulsion, or the like.

In order to improve the aggregating characteristics, it is possible that the treatment liquid contains polymer particles having a polarity opposite to the ink, so as to produce aggregate with the pigment and the polymer particles in the ink.

Moreover, in order to improve the aggregating characteristics, it is possible that the treatment liquid contains a curing agent corresponding to a polymer particle component contained in the ink, so that when the treatment liquid and the ink come into contact with each other, the resin emulsion component in the ink is cross-linked or polymerized and aggregates.

The treatment liquid according to the present embodiment may contain a surface active agent.

Desirable examples of the surface active agent include: in a hydrocarbon system, an anionic surface active agent, such as a salt of a fatty acid, an alkyl sulfate ester salt, an alkyl benzene sulfonate salt, an alkyl naphthalene sulfonate salt, a dialkyl sulfosuccinate salt, an alkyl phosphate ester salt, a naphthalene sulfonate/formalin condensate, and a polyoxyethylene alkyl sulfonate ester salt; and a non-ionic surface active agent, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerin fatty acid ester, and an oxyethylene oxypropylene block copolymer. Desirable examples of the surface active agent further include: Surfynols (manufactured by Air Products & Chemicals), which is an acetylene-based polyoxyethylene oxide surface active agent, and an amine oxide type of amphoteric surface active agent, such as N,N-dimethyl-N-alkyl amine oxide.

Moreover, it is also possible to use the surface active agents cited in Japanese Patent Application Publication No. 59-157636, pages 37 to 38, and Research Disclosure No. 308119 (1989). Furthermore, it is also possible to use a fluoride type (alkyl fluoride type), or silicone type of surface active agent such as those described in Japanese Patent Application Publication Nos. 2003-322926, 2004-325707 and 2004-309806. It is also possible to use a surface tension adjuster of this kind as an anti-foaming agent; and a fluoride or silicone compound, or a chelating agent, such as ethylenediamine tetraacetic acid (EDTA), can also be used.

The surface active agent contained in the treatment liquid has beneficial effects in raising the wetting properties on the intermediate transfer body by reducing the surface tension. Similarly, in the case where the ink droplets are deposited in advance, the wetting properties on the ink are improved, and therefore the aggregating action effectively progresses due to the increase in the contact surface area between the treatment liquid and the ink.

It is desirable in the present embodiment that the treatment liquid has the surface tension of 10 mN/m through 50 mN/m; and from the viewpoint of achieving good wetting properties on the intermediate transfer body, formation of fine droplets and good ejection properties, the surface tension of the treatment liquid is more desirably 15 mN/m through 45 mN/m.

It is desirable in the present embodiment that the treatment liquid has the viscosity of 1.0 mPa·s through 20.0 mPa·s.

Apart from the foregoing, according to requirements, it is also possible that the treatment liquid contains a pH buffering agent, an anti-oxidation agent, an antibacterial agent, a viscosity adjusting agent, a conductive agent, an ultraviolet absorbing agent, or the like.

Inkjet Recording Apparatus

FIG. 1 is a schematic drawing which shows the approximate composition of the inkjet recording apparatus according to the present embodiment. As shown in FIG. 1, the inkjet recording apparatus 10 according to the present embodiment includes: an intermediate transfer body 12, a treatment liquid ejection unit 14, an ink ejection unit 16 and a transfer unit 18; and also has a solvent removal unit 20, a cleaning unit 22 and an image fixing unit 24.

The intermediate transfer body 12 is constituted of an endless belt having a prescribed width, and it is wound about a plurality of rollers 26. In the present embodiment, for example, four rollers 26A to 26D are used. There are also modes which use a drum-shaped member and a plate-shaped member as the intermediate transfer body 12.

The driving force of a motor (not illustrated) is transmitted to at least one main roller of the plurality of rollers 26, and by driving this motor, the intermediate transfer body 12 is caused to rotate about the outer side of the rollers 26 (26A to 26D) in the counter-clockwise direction in FIG. 1 (hereinafter, called the "direction of rotation of the intermediate transfer body").

A recording head (treatment liquid head) 30S corresponding to the treatment liquid (S) is provided in the treatment liquid ejection unit 14. The treatment liquid head 30S ejects treatment liquid from an ejection face which opposes the intermediate transfer body 12. Accordingly, the treatment liquid is deposited onto the recording surface 12a of the intermediate transfer body 12.

The ink ejection unit 16 is disposed on the downstream side of the treatment liquid ejection unit 14 in terms of the direction of rotation of the intermediate transfer body. The ink ejection unit 16 includes recording heads (ink heads) 30K, 30C, 30M and 30Y corresponding respectively to the inks of the colors of black (K), cyan (C), magenta (M) and yellow (Y). The ink heads 30K, 30C, 30M and 30Y respectively eject inks of the corresponding colors, from ejection faces which oppose the intermediate transfer body 12. Accordingly, the inks of respective colors are deposited onto the recording surface 12a of the intermediate transfer body 12.

The treatment liquid head 30S and the ink heads 30K, 30C, 30M and 30Y are all full line heads formed with a plurality of ejection ports (nozzles) through the maximum recordable width of an image formed on the intermediate transfer body 12. This makes it possible to record images at higher speed onto the intermediate transfer body 12, compared to a serial head which records by moving a short shuttle head back and forth reciprocally in the breadthways direction of the intermediate transfer body 12 (the direction of the obverse-reverse of the sheet containing FIG. 1). Of course, the present invention can also be applied suitably to a serial head system that is capable of relatively high-speed recording, for example, a one-pass recording system which forms one line by means of one scan.

In the present embodiment, all of the recording heads (the treatment liquid head 30S, the ink heads 30K, 30C, 30M and 30Y) have the same structure, and below, a representative example of the recording heads is denoted with the reference numeral 30. The mechanism of the recording head 30 is described hereinafter. The implementation of the present invention is not limited to a case where the recording heads all have the same structure, and it is possible, for example, for the treatment liquid head 30S and the ink heads 30K, 30C, 30M and 30Y to have separate structures.

When the treatment liquid has been deposited from the treatment liquid head 30S onto the intermediate transfer body 12, then due to the rotation of the intermediate transfer body 12, the region of the intermediate transfer body 12 on which the treatment liquid has been deposited is moved successively to positions directly below the ink heads 30K, 30C, 30M and 30Y, and the corresponding inks of the respective colors are deposited from the ink heads 30K, 30C, 30M and 30Y. As described above, the treatment liquid has a function of causing the solvent-insoluble material (coloring material, etc.) in the inks to aggregate.

Preferably, the application amounts of the treatment liquid and the ink are adjusted as required. For example, it is preferable that the application amount of the treatment liquid is changed in accordance with the recording medium to which the image is transferred, in order to adjust properties, such as viscoelasticity, of the aggregate formed when the treatment liquid and the ink are mixed.

The solvent removal unit 20 is disposed on the downstream side of the ink ejection unit 16 in terms of the direction of rotation of the intermediate transfer body 12. The solvent removal unit 20 includes a solvent removal roller 32, which faces the roller 26A across the intermediate transfer body 12. The solvent removal roller 32 is constituted by a porous material in the shape of a roller, and it is disposed in such a manner that it abuts against the recording surface 12a of the intermediate transfer body 12. Other modes involve a method which removes excess solvent from the intermediate transfer body 12 by means of an air knife, or a method which removes the solvent by heating and evaporating it, or the like. In these modes for solvent removal, the mode that does not use heating is preferable. In the method that applies heat to the surface of the intermediate transfer body or the aggregate on the intermediate transfer body and thereby drives off the solvent, there may be a case where the aggregate is excessively heated and thereby the solvent is excessively driven off, so that the viscoelasticity of the aggregate suitable for the transfer is not maintained, and the transfer characteristics are deteriorated as a result. Moreover, heating the intermediate transfer body may affect the ejection characteristics of the inkjet head.

In the solvent removal unit 20, the solvent on the recording surface 12a of the intermediate transfer body 12 is removed by means of the solvent removal roller 32. Therefore, even if a large amount of the treatment liquid is deposited onto the recording surface 12a of the intermediate transfer body 12, the solvent is removed by the solvent removal unit 20 and consequently, there is no transfer of large quantities of solvent (dispersion medium) to the recording medium 34, in the transfer unit 18. Therefore, even in cases where paper is used as the recording medium 34, the characteristic problems of aqueous solvents, such as curling and cockling, do not occur.

The removal of the excess solvent from the ink aggregate by means of the solvent removal unit 20 also accomplishes condensation and increased internal aggregating force of the aggregate. The cohesion of the polymer particles in the aggregate is thus enhanced, and the internal aggregating force of the aggregate is increased before the transfer. Since the ink aggregate is effectively condensed through the solvent removal, then the transferred image with improved fixing properties and gross properties can be formed on the recording medium.

It is not always necessary that the solvent is completely removed by means of the solvent removal unit 20. When the ink aggregate is excessively condensed through excessive solvent removal, there may be a case where the adhesiveness of the ink aggregate becomes too large on the intermediate transfer body, and the pressure required for the transfer is too large. Therefore, it is rather preferable that a small amount of the solvent remains even after the solvent removal, for the purpose of maintaining the viscoelasticity of the ink aggregate suitable for the transfer. When the small amount of the solvent remains after solvent removal, the remaining solvent separates from the ink aggregate and forms a thin liquid film between the ink aggregate and the intermediate transfer body since the ink aggregate is hydrophobic while nonvolatile components (chiefly, organic solvent components such as glycerin) of the solvent are hydrophilic. Thus, the adhesiveness of the ink aggregate on the intermediate transfer body is reduced, and it is preferable in terms of transfer characteristics.

The transfer unit 18 is disposed on the downstream side of the solvent removal unit 20 in terms of the rotation direction of the intermediate transfer body 12. The transfer unit 18 includes a pressurization roller 36 at a position facing the roller 26B across the intermediate transfer body 12. A heater 37 (corresponding to a "heating device") is provided in the pressurization roller 36, and the heater 37 raises the temperature of the circumferential surface of the pressurization roller 36. The recording medium 34 is conveyed from the left-hand side to the right-hand side in FIG. 1, in such a manner that it passes between the intermediate transfer body 12 and the pressurization roller 36. When the medium passes between the intermediate transfer body 12 and the pressurization roller 36, the front surface side of the recording medium 34 makes contact with the recording surface 12a of the intermediate transfer body 12, and pressure is applied by the pressurization roller 36, from the rear surface side of the recording medium 34, thereby causing the image formed on the recording surface 12a of the intermediate transfer body 12 to be transferred onto the recording medium 34.

In the present embodiment, it is preferable that the heating device is arranged only in the transfer unit of the intermediate transfer body. By means of this composition, it is possible to prevent the problems of excess heat load and excess solvent removal from the ink aggregate, which may arise in the case of entire surface heating of the transfer body. Moreover, the ink aggregate is heated at the transfer unit 18, and major part of the solvent in the ink aggregate is removed. The internal aggregating force of the ink aggregate is thereby increased through not only the physical condensation of the ink aggregate caused by pressurization but also the enhanced cohesion of the polymer particles caused by heating, during a short period of time from immediately before the transfer to the transfer in the region where the transfer body is in contact with the pressurization/heating roller.

In this case, since the solvent can be promptly removed by means of heat, then the transfer rate is not deteriorated even if the solvent removal is not carried out before the transfer. However, it is preferable to remove the solvent in advance, since the amount of solvent to be evaporated is reduced and the condensation is more effective, and moreover there is also a benefit that the heat load on the transfer unit can be reduced. Further, since the ink aggregate is effectively condensed by heating, then the transferred image with improved fixing properties and gross properties can be formed on the recording medium.

The transfer temperature and the transfer pressure may be optimized in accordance with the type of the recording medium, print conditions, and the like.

A releasing layer may be provided on the surface of the intermediate transfer body 12. Since the releasing surface thus formed has a low surface energy and high releasing properties, then the transfer rate is further improved. In the present embodiment, the transfer rate is sufficient even if the releasing surface is not formed; however, the releasing layer is preferably provided on the intermediate transfer body in terms of cleaning burden. The releasing surface described here is a surface having a critical surface tension of not greater than 30 mN/m and/or a surface on which water assumes a contact angle of not less than 75°.

Preferred examples of material of the surface for the intermediate transfer body 12 include: a polyurethane resin, a polyester resin, a poly styrene resin, a polyOlfine resin, a polybutadiene resin, a polyamide resin, a polyvinylchloride resin, a polyethylene resin, a polyfluoride resin, and a polyimide resin.

The cleaning unit 22 is disposed on the downstream side of the transfer unit 18 in terms of the direction of rotation of the transfer body 12, and on the upstream side of the treatment liquid ejection unit 14 in terms of the direction of rotation of the transfer body 12. The cleaning unit 22 includes a cleaning roller 38, which is provided in a position facing the roller 26C across the intermediate transfer body 12 and is disposed so as to abut against the recording surface 12a of the intermediate transfer body 12, thereby removing the residual matter, and the like, which is left on the recording surface 12a of the intermediate transfer body 12 after the transfer.

The cleaning roller 38 may be made of a flexible and porous member, which cleans the surface of the intermediate transfer body 12 (recording surface 12a) while being impregnated with cleaning liquid from a cleaning liquid deposition device, or a brush may be provided on the surface of the cleaning roller 38 and dirt may be removed from the surface of the intermediate transfer body 12 with the brush, while applying cleaning liquid onto the surface of the intermediate transfer body 12. Alternatively, residual material on the surface of the intermediate transfer body 12 may be wiped away by providing a flexible blade on the surface of the cleaning roller 38. Making the linear speed of the surface of the cleaning roller 38 slower or faster than the linear speed of the surface of the intermediate transfer body 12, rather than the same speed, enables the removal rate of the residual matter to be increased. This is because the speed differential between the surface of the cleaning roller 38 and the surface of the intermediate transfer body 12 generates a shearing force at the surface of the intermediate transfer body 12, and this causes the residual matter to be removed effectively.

In the present embodiment, the image fixing unit 24 may be provided as required, in order to reliably fix the ink aggregate on the recording medium after the transfer.

The image fixing unit 24 is disposed on the recording medium output side of the transfer unit 18 (the right-hand side in FIG. 1). The image fixing unit 24 includes two fixing rollers 40A and 40B, arranged at the front and rear surfaces of the recording medium 34, and by heating and pressurizing the image having been transferred to the recording medium 34 by means of these fixing rollers 40A and 40B, it is possible to increase the fixing characteristics of the recording image on the recording medium 34. It is preferable that one of the fixing rollers 40A and 40B is a pressurization roller and the other is a heat roller, but the present invention is not limited to this composition.

In the present embodiment, a heating device (not shown) may be provided that heats the recording medium 34 before the recording medium is conveyed to the transfer unit 18.

If the recording medium 34 is heated to a desired transfer temperature immediately before the recording medium 34 comes in contact with the ink aggregate directly, then heat transfer is more reliably completed in a short period during the transfer-nipping. Moreover, the ink aggregate reliably comes into contact with the surface of the recording medium by heating the recording medium to the desired transfer temperature in advance, compared to the case where the recording medium is heated during the transfer-nipping only.

The heating temperature of the recording medium can be freely adjusted in accordance with the type of the recording medium 34, and the viscoelasticity of the ink aggregate can be controlled by means of this temperature adjustment.

If the recording medium 34 is a regular paper (normal paper), high-quality paper, and the like, in which there is considerable surface roughness due to pulp fiber and the large anchor effect is expected between the ink aggregate and the recording medium, then it is possible to render the good fixing properties to the ink aggregate on the recording medium such as a regular paper, high-quality paper, and the like, by controlling the viscoelasticity of the ink aggregate by means of adjusting not only the heating temperature of the transfer unit but also the heating temperature of the surface of the recording medium that directly makes contact with the ink aggregate during the transfer.

If the recording medium 34 is a coated paper, and the like, whose surface is smooth, then it is possible to render the improved fixing properties to the ink aggregate on the recording medium after the transfer, by adjusting the viscoelasticity of the ink aggregate to relatively hard compared to the case of the recording medium having large surface roughness.

Next, the structure of the recording head 30 is described.

Figure 2:
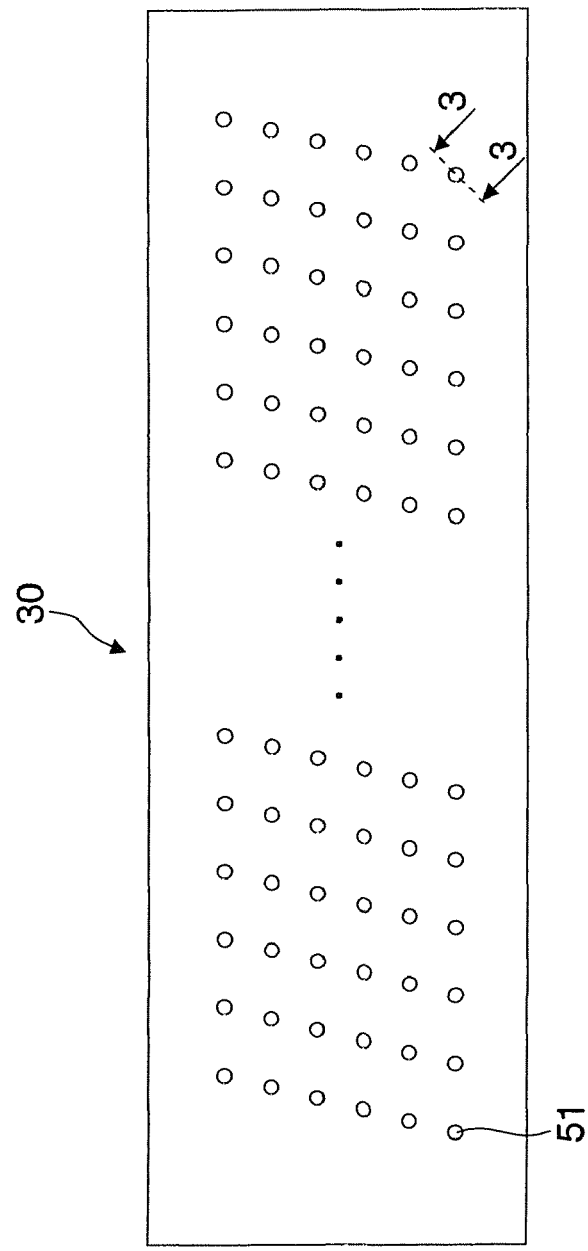
FIG. 2 is a plan diagram showing an ejection face of a recording head.
Figure 3:
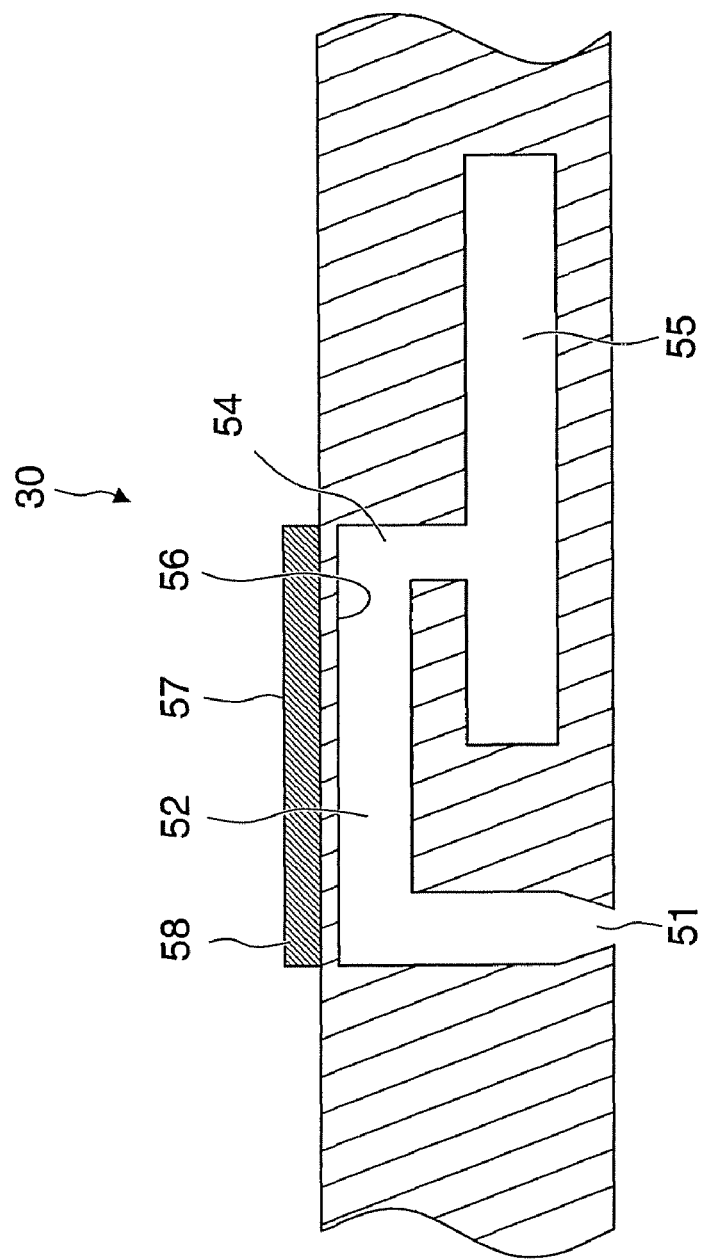
FIG. 3 is a partial cross-sectional diagram along line 3-3 in FIG. 2.

FIG. 2 is a plan diagram showing the ejection face of the recording head 30, and FIG. 3 is a partial cross-sectional diagram along line 3-3 in FIG. 2. In FIG. 2, the lengthwise direction of the head 30 corresponds to the direction of the obverse-reverse of the sheet containing FIG. 1. The recording head 30 according to the present embodiment is constituted by a full line head formed with a plurality of ejection ports (nozzles) 51 through a length corresponding to the maximum recording width of an image formed on the intermediate transfer body 12. As shown in FIG. 2, the nozzles 51 are arranged two-dimensionally (in a matrix configuration) following the lengthwise direction of the head and an oblique direction which is not perpendicular to the lengthwise direction of the head, and it is possible to achieve high-resolution image recording on the intermediate transfer body 12 by means of this high-density arrangement of the nozzles.

As shown in FIG. 3, pressure chambers 52 connected to the nozzles 51 are provided in the recording head 30, for the respective nozzles 51. A supply port 54 is formed at one end of each pressure chamber 52, and the pressure chamber 52 is connected to a common flow channel 55 by means of this supply port 54. A prescribed liquid (treatment liquid or ink of one of the respective colors) is accumulated in the common flow channel 55, and the liquid is supplied from the common flow channel 55 to the pressure chambers 52.

One wall of each pressure chamber 52 (the upper face in FIG. 3) is constituted by a diaphragm 56, and a piezoelectric element 58 is mounted on the diaphragm 56 at a position corresponding to the pressure chamber 52. An individual electrode 57 is provided on the upper surface of the piezoelectric element 58. In the present embodiment, the diaphragm 56 is constituted by a conductive material, and it also serves as a common electrode for the piezoelectric elements 58.

By adopting this composition, when a drive voltage is applied to the piezoelectric element 58, a pressure is applied to the liquid in the pressure chamber 52 due to the displacement of the piezoelectric element 58, thereby causing a droplet of the liquid to be ejected from the nozzle 51. After ejection, the liquid is supplied to the pressure chamber 52 from the common flow channel 55.

The present embodiment is a mode using a piezoelectric system, in which ejection is performed by using the piezoelectric elements 58, but the implementation of the present invention is not limited to this, and it is also possible, for example, to adopt a thermal system which performs ejection by using electrical-thermal converting elements, such as heaters, or other types of ejection systems.

Figure 4:
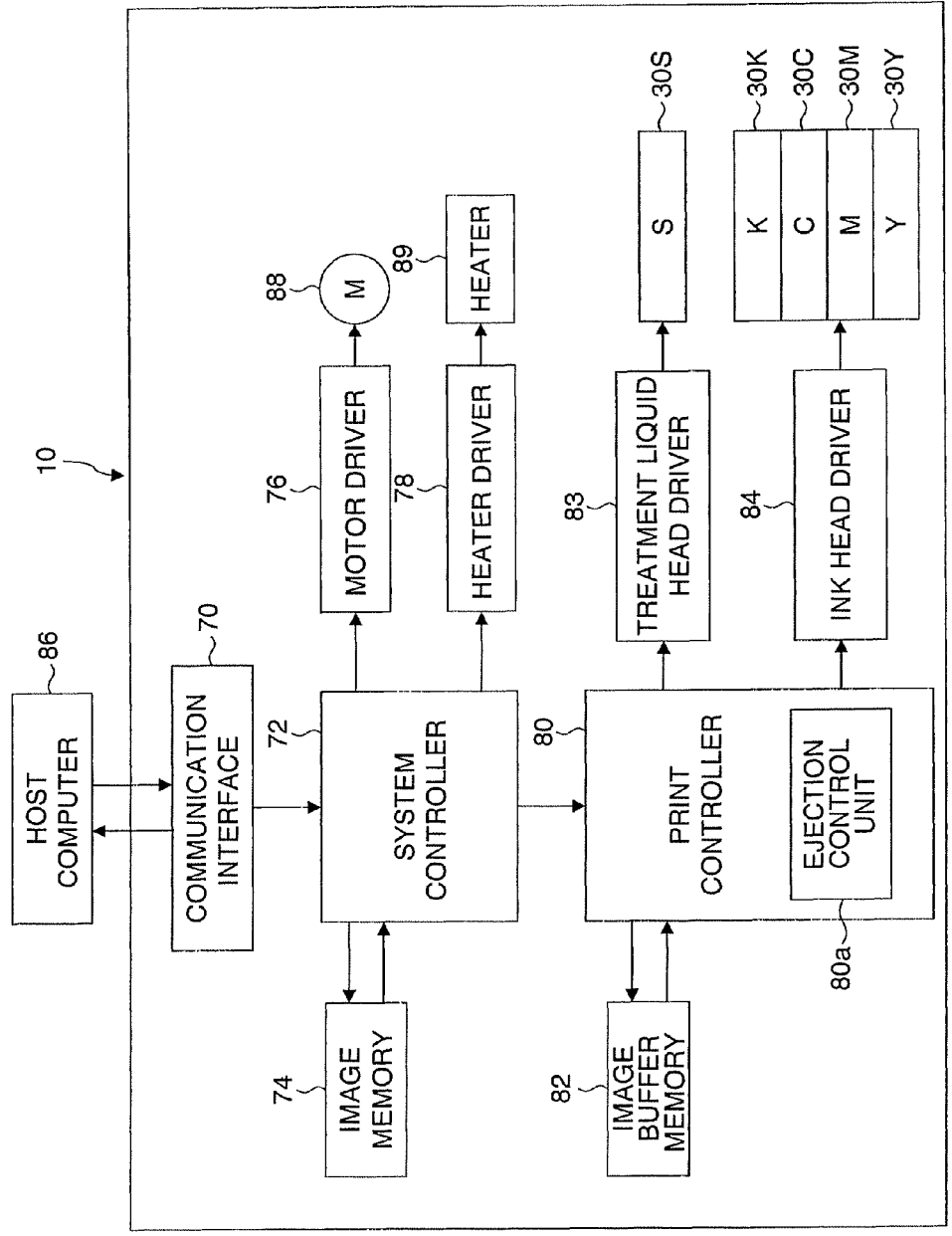
FIG. 4 is a principal block diagram showing the system composition of the inkjet recording apparatus according to an embodiment of the present invention.

FIG. 4 is a principal block diagram showing the system configuration of the inkjet recording apparatus 10. The inkjet recording apparatus 10 includes a communication interface 70, a system controller 72, an image memory 74, a motor driver 76, a heater driver 78, a print controller 80, an image buffer memory 82, a treatment liquid head driver 83, an ink head driver 84, and the like.

The communication interface 70 is an interface unit for receiving image data sent from a host computer 86. A serial interface or a parallel interface may be used as the communication interface 70. A buffer memory (not shown) may be mounted in this portion in order to increase the communication speed.

The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is a control unit for controlling the various sections, such as the communications interface 70, the image memory 74, the motor driver 76, the heater driver 78, and the like. The system controller 72 is constituted by a central processing unit (CPU) and peripheral circuits thereof, and the like, and in addition to controlling communications with the host computer 86 and controlling reading and writing from and to the image memory 74, or the like, it also generates a control signal for controlling the motors 88 of the various units and the heater 89.

The motor driver (drive circuit) 76 drives the motor 88 in accordance with commands from the system controller 72. The heater driver 78 drives the heater 89 in accordance with commands from the system controller 72.

The print controller 80 is a control unit having a signal processing function for performing various treatment processes, corrections, and the like, in accordance with the control implemented by the system controller 72, in order to generate a signal for controlling printing from the image data in the image memory 74. The print controller 80 supplies the print control signal (dot data) thus generated to the head drivers 83 and 84. Prescribed signal processing is carried out in the print controller 80, and the ejection volume and the ejection timing of liquid droplets from the recording heads 30 (30S, 30K, 30M, 30C, 30Y) are controlled via the head drivers 83 and 84, on the basis of the image data. By this means, prescribed dot sizes and dot positions can be achieved. The ejection control that is one of the characteristics of the present invention is implemented by the ejection control unit 80a of the print controller 80.

The print controller 80 is provided with the image buffer memory 82; and image data, parameters, and other data are temporarily stored in the image buffer memory 82 when image data is processed in the print controller 80. The aspect shown in FIG. 4 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head drivers 83 and 84 (the treatment liquid head driver 83 and the ink head driver 84) respectively generate drive signals for driving the piezoelectric elements 58 (see FIG. 3) of the corresponding recording heads 30 (30S, 30K, 30C, 30M, 30Y), on the basis of the dot data supplied from the print controller 80, and they supply the generated drive signals to the piezoelectric elements 58, accordingly. A feedback control system for maintaining constant drive conditions for the recording heads 30 may be included in the head drivers 83 and 84.

In the present embodiment, the treatment liquid is applied on the intermediate transfer body 12 by ejecting the treatment liquid from the treatment liquid head 30S; however, the method of applying the treatment liquid is not limited to this in carrying out the present invention.

In a modified embodiment, it is possible to use an application roller in place of the treatment liquid head 30S to coat the intermediate transfer body 12 with the treatment liquid.

The treatment liquid can readily be applied substantially all over the intermediate transfer body 12 including an image formation region where the ink droplets are deposited. In this modified embodiment, the treatment liquid is preferably applied on the intermediate transfer body 12 to a thickness of 1 μm to 5 μm. A device may also be provided which uniforms the thickness of the treatment liquid on the intermediate transfer body 12. The examples of this device includes: a device which is provided with an air knife; and a device in which a member having a sharp edge is arranged above the intermediate transfer body 12 at a distance equal to a specified thickness of the treatment liquid.

In an image forming apparatus such as that described above, by using inks and a treatment liquid which satisfy the conditions given below, it is possible to obtain an image of high quality which is free of ink bleeding, as well as preventing density non-uniformities in solid image regions.

More specifically, it is possible to cause ink containing a coloring material (e.g., pigment) and polymer particles dispersed therein to aggregate by means of the treatment liquid, thereby obtaining an image of high-quality which is free of the ink bleeding, as well as preventing the occurrence of density non-uniformities in solid image regions, provided that: the coloring material has properties whereby the volume-average particle size of the coloring material is changed with the pH of an aqueous solution of coloring material in which only the coloring material is dispersed; the polymer particles have properties whereby the volume-average particle size of the polymer particles is changed with the pH of an aqueous solution of polymer in which only the polymer particles are dispersed; and the inequality equation of $|\alpha-\beta 1| \geqq |\alpha-\beta 2|$ is satisfied, where $\alpha$ is the pH value of the first liquid before the first liquid is subjected to a pH change caused by the second liquid, $\beta 1$ is a pH value of the aqueous coloring material solution at which the volume-average particle size of the coloring material dispersed therein reaches 1000 nm along with the pH change of the aqueous coloring material solution, and $\beta 2$ is a pH value of the aqueous polymer solution at which the volume-average particle size of the polymer particles dispersed therein reaches 1000 nm along with the pH change of the aqueous polymer solution. Moreover, similar beneficial effects can be achieved, provided that: the coloring material has properties whereby the zeta potential of the coloring material is changed along with a pH change of an aqueous solution of coloring material in which only the coloring material is dispersed; the polymer particles has properties whereby the zeta potential of the polymer particles is changed along with a pH change of an aqueous solution of polymer in which only the polymer particles are dispersed; and the inequality equation of $|\alpha-\gamma 1| \geqq |\alpha-\gamma 2|$ is satisfied, where $\alpha$ is the pH value of the first liquid before the first liquid is subjected to a pH change caused by the second liquid, $\gamma 1$ is a pH value of the aqueous coloring material solution at which an absolute value of the zeta potential of the coloring material dispersed therein is reduced to 5 mV along with the pH change of the aqueous coloring material solution, and $\beta 2$ is a pH value of the aqueous polymer solution at which an absolute value of the zeta potential of the polymer particles dispersed therein is reduced to 5 mV along with the pH change of the aqueous polymer solution. Furthermore, additional beneficial effects are obtained in that fixing characteristics of the recorded image can be enhanced, and in the case of an intermediate transfer recording method, transfer defects and transfer non-uniformities can be prevented and the beneficial effects described above can be obtained to the extent as in a direct recording method (a method without intermediate transfer).

The reason why these beneficial effects are obtained is inferred to be because in the initial stage where the pH of the ink declines when the treatment liquid and the ink come into contact with each other to be mixed together, aggregation of the polymer particles occurs before aggregation of the coloring material (e.g., pigment), and therefore the coloring material becomes involved in the aggregation of the polymer particles and the coloring material also thereby undergoes aggregation, with a greater aggregating force and at a faster aggregation speed than in the case of aggregation of the coloring material alone. The reason why an action occurs in which the polymer particles catch up the coloring material and cause the coloring material to aggregate is inferred to be because, as the polymer particles aggregate, the polymer particles are liable to create a state such that molecule chains of the polymer particles are intertwined with each other to form a state of a film having a mesh structure. Due to this kind of action, it is possible further to promote aggregation of the coloring material, and the reaction can be made to proceed without giving rise to any unreacted (non-aggregated) coloring material. Consequently, reaction non-uniformities do not occur within the image, and it is possible to suppress effects caused by reaction non-uniformities, such as the ink bleeding due to permeation of unreacted coloring material into the recording medium, or density non-uniformities within solid image regions. As a result, an image of high quality can be obtained.

The intermediate transfer system is beneficial in improving image quality by further suppressing the ink bleeding, in comparison with a direct recording system, since there is no permeation of the solvent component into the recording medium in the case of the intermediate transfer system.

Furthermore, even if the treatment liquid contains a polyvalent metal salt having a strong aggregating force, it is possible to suppress reaction non-uniformities in the image caused by the strong aggregation characteristics of the polyvalent metal salt, since the aggregation of the polymer particles occurs before the aggregation of the coloring material (e.g., pigment). Therefore, even in the cases where the treatment liquid contains a polyvalent metal salt or poly allylamine, it is still possible to obtain an image of high density and high quality, which is free of the ink bleeding or density non-uniformities.

Moreover, the structure of the aggregate formed when the present invention is carried out is considered to be such that the pigment aggregates and the polymer particle aggregates are distributed uniformly in the whole aggregate, since the pigment (coloring material) aggregates in such a manner that the pigment becomes caught up in the aggregation of the polymer particles. Consequently, the bonding force between the pigment aggregates is enhanced by the bonding action of the polymer particle aggregate situated between the pigment aggregates, and hence a beneficial effect is obtained in improving the internal aggregating force of the aggregate material as a whole.

In particular, it is possible further to improve these beneficial effects by removing the solvent in the aggregate, or by fusing (softening and combining together) the polymer particles in the aggregate by heating.

Furthermore, this is also thought to be the reason why it is possible to prevent transfer defects or transfer non-uniformities when the image composed of the aggregates formed on the intermediate transfer body is transferred to a recording medium in an intermediate transfer recording method. More specifically, since an aggregating force sufficient for transfer can be obtained, then it is possible to prevent transfer defects or transfer non-uniformities.

In the present invention, the aggregating characteristics of the polymer particles complements the aggregating characteristics of the pigment (coloring material), and therefore it is not necessary for the pigment itself to have strong aggregating characteristics, and the range of choice of the pigment material can be increased.

Preferably, the coloring material and the polymer contained in the first liquid form aggregate particles along with a pH change of the first liquid caused by the second liquid; and when the pH of the first liquid becomes $\beta 1$, the aggregate particles having diameters of not less than 500 nm account for not less than 80 vol % of all of the aggregate particles. Since the aggregate particles having diameters equal to or greater than 500 nm amounts to 80 vol % or above of all of the aggregate particles when the pH of the first liquid becomes $\beta 1$, then it is possible to obtain an image of high quality which is free of ink bleeding and it is possible to prevent density non-uniformities.

Moreover, desirably, one of either the ink or the treatment liquid is alkaline, and the other is acid. By making one liquid of the ink set alkaline and making the other acid, it is possible to cause the coloring material and polymer particles to aggregate appropriately, by means of the treatment liquid.

Furthermore, it is desirable that the differential between the pH value of the ink and the pH value of the treatment liquid be no less than 3.0 and no more than 6.0. By making the differential between the pH of the ink and the pH of the treatment liquid in the ink set no less than 3.0 and no more than 6.0, it is possible to make the pigment and the polymer particles in the ink aggregate more appropriately by means of the treatment liquid.

If the pH differential between the treatment liquid and the ink is less than 3, then sufficient concentration diffusion of the base composition (OH⁻ ions) from the treatment liquid may not be achieved, and a sufficient aggregating action may not be obtained. In this case, the reduction of the surface potentials of the coloring material particle and the polymer particle caused by the neutralization is delayed, and the dispersion of the coloring material particles and the polymer particles in the ink is not sufficiently destabilized. Consequently, image disturbance on the transfer body occurs due to the flow of the coloring material on the transfer body, and transfer defects occur due to the fact that the aggregate has insufficient aggregating force at the transfer stage. If, on the other hand, the pH differential between the treatment liquid and the ink is 3 or more, then sufficient concentration diffusion occurs and a desirable aggregating action is achieved.

Method of Determining Aggregation Behavior of Pigment and Polymer Particles in Ink The aggregation behavior of the pigment and the polymer particles in the ink can be determined readily by means of the following method, for example.

A mixed liquid adjusted to a desired pH value within the range between the pH value of the treatment liquid and the pH value of the ink is prepared by dropping the treatment liquid into the ink by a suitable quantity, and by then placing this mixed liquid in a centrifuge device and separating it into an aggregate and liquid (supernatant liquid) separated from the aggregate. For example, if an aggregate which has reached a particle size of 1,000 nm or larger due to aggregation is separated by centrifuge at 2000 rpm for 30 minutes, then the particles having a particle size of 1,000 nm or larger will precipitate out and the aggregate alone can be separated satisfactorily from the mixed liquid. Consequently, the aggregation behaviors of the pigment and the polymer particles contained in the ink can be determined by examining the change in the ratio of the components of the aggregate separated in this way (in other words, the ratio of the pigment and the ratio of the polymer particles) and the change in the weight of the aggregate material, with respect to the pH value of the mixed liquid. The aggregation behaviors of the coloring material and the polymer can also be determined by analyzing the change, with respect to the pH value of the mixed liquid, in the light absorption amount of the mixed liquid when the mixed liquid is irradiated with a laser light, the mixed liquid containing components of micro-particles dispersed therein rather than aggregated.

EXAMPLES

The present invention is described in more specific terms below with reference to practical examples.

Practical examples of the present invention will be described below, but the present invention is not limited to these.

The ink (first liquid) and the treatment liquid (second liquid) used for carrying out the present invention were prepared. The ink and the treatment liquid prepared have the compositions described below.

Furthermore, a sample liquid (aqueous polymer solution) was prepared separately by adding polymer particles to the ink solvent component, in order to investigate the change in the volume-average particle size and the zeta potential of the polymer particles along with a pH change of the sample liquid (aqueous polymer solution).

Ink (Manufacture of Pigment Dispersion)

The components listed below were mixed in the composition as shown below so that the total quantity was 500 parts by weight, and 2,2'-Azobis(2,4-dimethyl)valeronitrile of 2 parts by weight was added as a polymerization initiator, thereupon carrying out sufficient nitrogen gas substitution to yield a resin mixture liquid:

stearyl methacrylate: 20 wt % styrene macromer: 5 wt % styrene: 10 wt % polypropylene glycol (9) methacrylate: 10 wt % methacrylic acid: 10 wt %

2-mercaptoethanol: 0.1 wt % deionized water: balance where the details of "styrene macromer" and "polypropylene glycol (9) methacrylate" are as follows:

styrene macromer: manufactured by Toa Gosei, product name: AS-6 (styrene homopolymerization macromer), number average molecular weight: 6000, polymerizable functional group: methacryloyloxy group; and polypropylene glycol (9) methacrylate: manufactured by Nippon Oil & Fats, product name: Blemmer PP-500 (number of added moles of propylene oxide: 9).

Next, methyl ethyl ketone of 500 parts by weight was heated to a temperature of 75° C. while agitated in a nitrogen atmosphere. The above-described resin mixture liquid was added dripwise over a period of 4 hours, while agitated at 75° C. Reaction continued for a further 6 hours while agitated at 75° C. Thereupon, the reaction product was cooled naturally to a temperature of 25° C., and then diluted by adding methyl ethyl ketone in such a manner that the solid content became 50%, thereby obtaining a resin dispersion having an average molecular weight of 19,000.

The copolymer dispersion (solid content: 50%) thus obtained of 15 parts by weight was taken and neutralized by adding 5 mol/L aqueous sodium hydroxide of 2 parts by weight, and Pigment Red 122 (product name: CROMOPHTAL Jet Magenta DMQ, manufactured by Ciba Specialty Chemicals) of 7.5 parts by weight was then added and the mixture was kneaded for 2 hours to 8 hours, according to requirements, by means of a roll mill. The kneaded mixture was dispersed in deionized water of 100 parts by weight. The organic solvent was removed completely from the dispersion thus obtained, under reduced pressure at 60° C., and the dispersion was further concentrated by removing water, thereby obtaining an aqueous dispersion of pigment-containing vinyl polymer particles having a solid content concentration of 20 wt %, which was used as the pigment dispersion in the inks with other components as follows.

(Ink 1)

pigment dispersion: 40 wt % polymer particle 1: Jurymer FC-30 (manufactured by Nihon Junyaku): 5 wt % glycerin: 8 wt % diethylene glycol: 8 wt %

Olfine: 1 wt % deionized water: balance (Ink 2)
    pigment dispersion: 40 wt %
    polymer particle 2: Joncryl 537 (manufactured by Johnson Polymer): 5 wt %
    glycerin: 8 wt %
    diethylene glycol: 8 wt %
    Olfine: 1 wt %
    deionized water: balance (Ink 3)
    pigment dispersion: 40 wt %
    polymer particle 3: Joncryl 7640 (manufactured by Johnson Polymer): 5 wt %
    glycerin: 8 wt %
    diethylene glycol: 8 wt %
    Olfine: 1 wt %
    deionized water: balance (Ink 4)
    pigment dispersion: 40 wt %
    polymer particle 4: A-104 (manufactured by To a Gosei): 5 wt %
    glycerin: 8 wt %
    diethylene glycol: 8 wt %
    Olfine: 1 wt %
    deionized water: balance (Ink 5)
    pigment dispersion: 40 wt %
    polymer particle 5: Ultrasol B400-H (manufactured by Ganz Chemical): 5 wt %
    glycerin: 8 wt %
    diethylene glycol: 8 wt %
    Olfine: 1 wt %
    deionized water: balance For a comparative example, the following ink 6 (aqueous coloring material solution) was prepared without adding polymer particles.

(Ink 6 (Aqueous Coloring Material Solution))
    pigment dispersion: 40 wt %
    glycerin: 8 wt %
    diethylene glycol: 8 wt %
    Olfine: 1 wt %
    deionized water: balance Inks were prepared by filtering the ink liquids through a filter having a mesh size of 5 μm.

The pH values of the inks 1 to 6 prepared in this way were measured with a pH meter, WM-50EG manufactured by DKK-TOA Corporation. The measured pH values are shown in Table 2.

Treatment Liquid
    Treatment liquids 1 to 2 having the compositions described below were prepared.

(Treatment Liquid 1)
    diethylene glycol: 20 wt %
    2-pyrrolidone-5-carboxylic acid: 5 wt %
    sodium hydroxide: 1 wt %
    Olfine E1010 (manufactured by Nissin Chemical Industry): 1 wt %
    deionized water: balance When the pH of the treatment liquid 1 prepared in this way was measured with a pH meter, WM-50EG manufactured by DKK-TOA Corporation, the pH was found to be 3.5.

(Treatment Liquid 2)
    diethylene glycol: 20 wt %
    magnesium nitrate hexahydrate: 6 wt %
    Olfine E1010 (manufactured by Nissin Chemical Industry): 1 wt %
    deionized water: balance When the pH of the treatment liquid 2 prepared in this way was measured with a pH meter, WM-50EG manufactured by DKK-TOA Corporation, the pH was found to be 5.5.

Polymer Particle Dispersion Solution
    Polymer particle dispersion solutions (aqueous polymer solutions) 1 to 5 having the compositions described below were prepared.

(Polymer Particle Dispersion Solutions 1 to 5)
    one of polymer particles 1 to 5: 5 wt %
    glycerine: 8 wt %
    diethylene glycol: 8 wt %
    Olfine E1010: 1 wt %
    deionized water: balance The polymer particles 1 to 5 used are the same as those of the polymer particles used for the inks 1 to 5.

Figure 5:
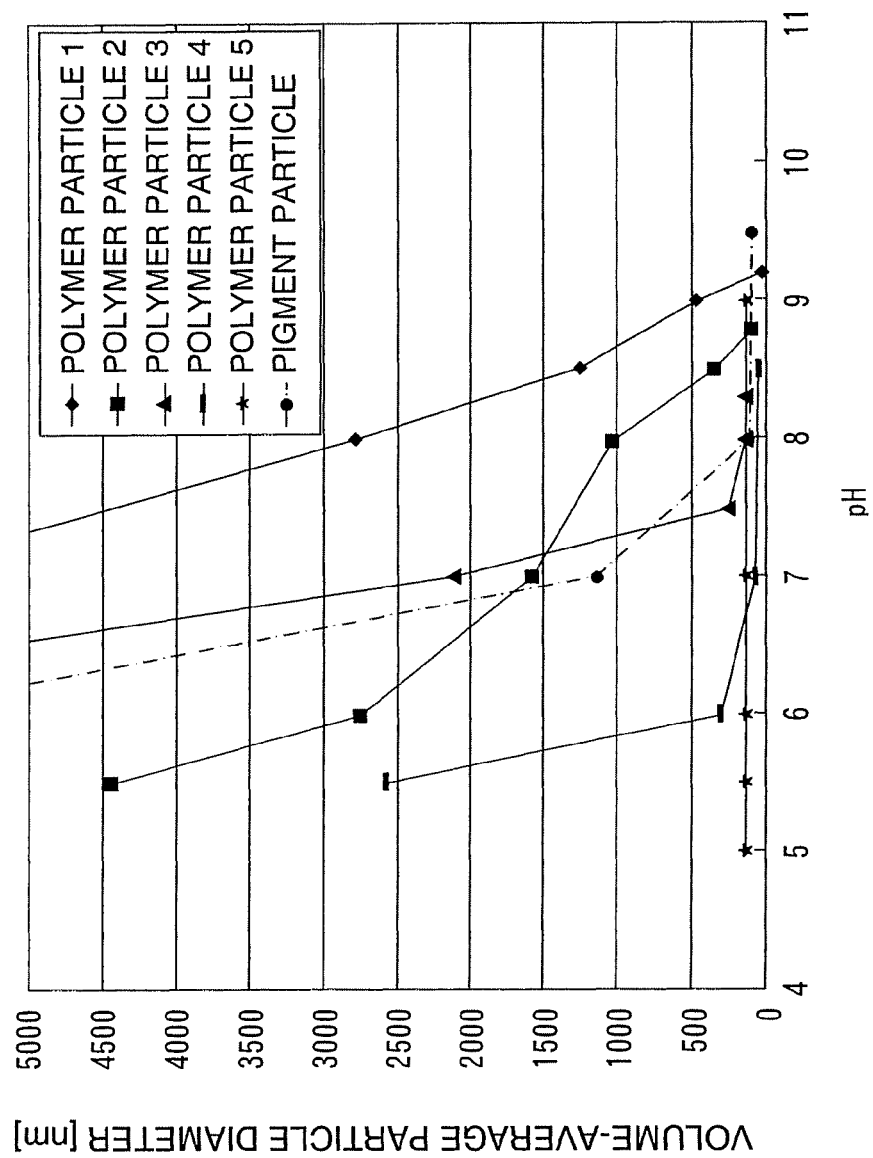
FIG. 5 is a diagram showing measurement results.

Dependence on pH, of Particle Diameter of Polymer and Pigment
    The pH dependence of the size (the dependence of the size on pH) of the polymer particles and the pigment particles was determined by the following method. Each of the polymer particle dispersion solutions (aqueous polymer solutions) 1 to 5 and the ink 6 was mixed with the treatment liquid 1 while being agitated. After the pH of the mixed liquid converged to a prescribed value, it was diluted with water to a suitable concentration and the volume-average particle size was measured using a UPA-EX150 Nanotrac particle size distribution measurement apparatus manufactured by Nikkiso Co., Ltd.
    The dilution rate was set to 1:1000 in the case of ink and 1:100 in the case of the polymer particle dispersion solution. The measurement results are shown in FIG. 5. Based on FIG. 5, the pH value at which the volume-average particle size becomes equal to or greater than 1,000 nm was determined for each of the polymer particle dispersion solutions 1 to 5 and the ink 6.
    Table 1 shows the pH values of the polymer particle dispersion solutions 1 to 5 and the ink 6, and the volume-average particle sizes of the polymer particles dispersed in the dispersion solutions 1 to 5 and the pigment particles dispersed in the ink 6, before the dispersion solutions 1 to 5 and the ink 6 are mixed with the treatment liquid 1. Table 1 also shows the pH value (β1 or β2) for each of the dispersion solutions 1 to 5 and the ink 6, at which the volume-average particle size becomes equal to or greater than 1,000 nm along with the pH change of each of the aqueous polymer particle solutions 1 to 5 and the ink 6. It is judged that aggregation has proceeded satisfactorily if the volume-average particle size of the pigment particles and the polymer particles has become equal to or greater than 1,000 nm.

Dependence on pH, of Zeta Potential of Polymer Particles and Pigment
    The pH dependence of the zeta potential (the dependence of the zeta potential on pH) of the polymer particles and the pigment was determined by the following method. Each of the aqueous polymer particle solutions 1 to 5 and the ink 6 was mixed with the treatment liquid 1, and the zeta potential was measured with a Zetasizer 2000 manufactured by Malvern Instruments, at a dilution rate of 1:500. Consequently, the pH values at which an absolute value of the zeta potential is reduced to 5 mV along with the pH change of each of the aqueous polymer particle solutions 1 to 5 and the ink 6 was determined.

Table 1 shows the pH values ($\gamma 1$ or $\gamma 2$) at which an absolute vale of the zeta potential is reduced to 5 mV.

Size of Particles Dispersed in Ink Containing Pigment and Polymer Particles

Furthermore, the volume-average particle size in the inks 1 to 5 containing both pigment and polymer particles was measured at the pH value of $\beta 1$. In this case, $\beta 1$ is a pH value at which the volume-average particle size of the pigment in the ink 6 (aqueous coloring material solution containing only pigment (coloring material) dispersed therein) reaches 1,000 nm along with the pH change of the ink 6 (the aqueous coloring material solution), and $\beta 1$ is shown in Table 1. The measurement of the volume-average particle size was carried out using a UPA-EX150 Nanotrac particle size distribution measurement apparatus manufactured by Nikkiso Co., Ltd, after the inks 1 to 5 were diluted with water at a dilution ratio of 1:1000. It was judged that both the polymer particles and the pigment had aggregated, if the ratio of particles having a volume-average particle size of 500 nm or larger was 95% or above according to the measurement results. Furthermore, it was also judged that both the polymer particles and the pigment had aggregated, if the volume-average particle size became too large, and evident precipitation of aggregated material and separation of the aggregate material from the solvent was observed. The measurement results are shown in Table 3.

TABLE 1

| | Experiment liquid | pH (experiment liquid) | Particle size (nm) | pH ($\beta 1$ or $\beta 2$) | pH ($\gamma 1$ or $\gamma 2$) |
|---|---|---|---|---|---|
| Polymer particle 1 | Polymer solution 1 | 9.2 | 33 | 8.5 ($\beta 2$) | 5.0 ($\gamma 2$) |
| Polymer particle 2 | Polymer solution 2 | 8.8 | 90 | 8.0 ($\beta 2$) | 3.5 ($\gamma 2$) |
| Polymer particle 3 | Polymer solution 3 | 8.5 | 144 | 7.0 ($\beta 2$) | 3.0 ($\gamma 2$) |
| Polymer particle 4 | Polymer solution 4 | 8.5 | 53 | 5.5 ($\beta 2$) | 2.0 ($\gamma 2$) |
| Polymer particle 5 | Polymer solution 5 | 9.5 | 124 | — | — |
| Pigment | Ink 6 (coloring material solution) | 8.5 | 95 | 7.0 ($\beta 1$) | 3.0 ($\gamma 1$) |

In the polymer particle dispersion solution 5, the polymer particles were not subjected to aggregation, and no values corresponding to $\beta 2$ and $\gamma 2$ were obtained in the results.

TABLE 2

| | pH of ink ($\alpha$) | $|\alpha - \beta 1|$ | $|\alpha - \beta 2|$ | $|\alpha - \gamma 1|$ | $|\alpha - \gamma 2|$ |
|---|---|---|---|---|---|
| Ink 1 | 8.5 | 1.5 | 0.0 | 5.5 | 3.5 |
| Ink 2 | 8.6 | 1.6 | 0.6 | 5.6 | 5.1 |
| Ink 3 | 8.5 | 1.5 | 1.5 | 5.5 | 5.5 |
| Ink 4 | 8.5 | 1.5 | 3.0 | 5.5 | 6.5 |
| Ink 5 | 8.8 | — | — | — | — |
| Ink 6 (coloring material solution) | 8.5 | 1.5 | 1.5 | 5.5 | 5.5 |

TABLE 3

| | Ratio of particles of size 500 nm or larger at pH of $\beta 1$ (=7.0) (%) |
|---|---|
| Ink 1 | — |
| Ink 2 | — |
| Ink 3 | 84 |
| Ink 4 | 73 |
| Ink 5 | 68 |

In table 3, the symbol "-" indicates a state where the aggregate precipitated and measurement could not be carried out (where the supernatant solution became transparent and there was virtually no particle dispersed in the supernatant solution).

In the case of the inks 1 and 2 (indicated with the symbol "-" in table 3), the ratio of particles equal to or greater than 500 nm in size is substantially 100%, and even if there are pigment particles or polymer particles which have not aggregated and are dispersed in the supernatant solution, they are extremely small in quantity and have virtually no influence on the beneficial effects of the present invention.

In this way, it is possible to investigate the differences in aggregation behavior between the pigment and the polymer particles, as described in the present invention.

Evaluation (Direct Recording Method)

The treatment liquid 1 and each of the inks 1 to 6 were deposited at a droplet ejection volume ratio of 1:1 by means of a modified machine of PX-G920 manufactured by Seiko Epson Corporation. A C2 paper (made by Fuji Xerox Office Supplies Inc.) was used as the recording medium on which printing is carried out.

(Ink Bleeding)

A thin line pattern was printed on the recording medium and observed visually, and a sensory evaluation regarding the ink bleeding was carried. The assessment criteria were as follows.

A: virtually no ink bleeding occurred

B: little ink bleeding

C: ink bleeding occurred, but of a tolerable level

D: severe ink bleeding, beyond range of tolerance (Inage Non-Uniformities in Solid Regions)

Printing was carried out by depositing treatment liquid and ink in a solid image pattern, and the density non-uniformities in the solid image region were subjected to a sensory evaluation by visual observation. The assessment criteria were as follows.

A: no density non-uniformities at all, based on visual observation

B: virtually no density non-uniformities, based on visual observation

C: noticeable density non-uniformities, based on visual observation; but within tolerable range D: clearly noticeable density non-uniformities, based on visual observation; outside tolerable range (Image Density)

A solid image pattern was printed by depositing the treatment liquid and the ink, and the optical density of the image was measured by using an X-Rite 538 (made by X-Rite Inc.)

The assessment criteria were as follows.

A: 1.2 or above

B: equal to or greater than 1.1 and less than 1.2

C: equal to or greater than 1.0 and less than 1.1

D: less than 1.0

The results of the above-described assessments regarding the ink bleeding, image non-uniformities in solid regions, and image density, are shown in Table 4.

TABLE 4

| | Ink No. | Bleeding | Density non-uniformity in solid region | High image density |
|---|---|---|---|---|
| Practical example 1 | Ink 1 | B | B | A |
| Practical example 2 | Ink 2 | B | B | A |
| Practical example 3 | Ink 3 | B | B | B |
| Comparative example 1 | Ink 4 | C | B | B |
| Comparative example 2 | Ink 5 | C | C | B |
| Comparative example 3 | Ink 6 | C | D | B |

(Intermediate Transfer Recording Method)

(Transfer Characteristics)

An evaluation based on an intermediate transfer method was carried out using an intermediate transfer apparatus including a treatment liquid deposition unit, an ink ejection head, a solvent removal unit and a transfer unit as shown in FIG. 1. A head of a PX-G920 manufactured by Seiko Epson Corporation was used as the ejection head, similarly to the above-described evaluation with the direct recording method, a SR series silicone rubber sheet having a thickness of 0.5 mm (made by Tigers Polymer Corp.) was used for the intermediate transfer body, and a ceramic porous body formed by sintering titanium oxide particles was used for the solvent absorbing roller. Transfer was carried out at a pressure of 1 MPa in the transfer unit, a heating temperature of 80° C. and a conveyance speed of 500 mm/sec.

100 dots (=10×10) were recorded, transfer was carried out under the conditions described above, and the number of dots transferred to the recording medium while preserving their dot shape was counted and this counted number of dots was defined as the transfer rate. Similarly to the case of the direct recording method, a C2 paper (manufactured by Fuji Xerox Office Supplies Inc.) was used as the recording medium for printing.

A: transfer rate 95% or above

B: transfer rate 90% or above

C: transfer rate less than 90%

Similar evaluations to those made for the direct recording method were also carried out for the intermediate transfer method, in respect of the ink bleeding, density non-uniformity in solid regions, and image density. The results of this assessment are shown in Table 5.

TABLE 5

| | Ink No. | Bleeding | Density non-uniformity in solid region | High image density | Transfer characteristics |
|---|---|---|---|---|---|
| Practical example 4 | Ink 1 | A | A | A | A |
| Practical example 5 | Ink 2 | A | B | A | A |
| Practical example 6 | Ink 3 | A | B | B | A |
| Comparative example 4 | Ink 4 | B | B | B | B |
| Comparative example 5 | Ink 5 | B | C | B | B |
| Comparative example 6 | Ink 6 | C | D | B | B |

As shown in Table 5, in the case of an intermediate transfer recording method, using the ink set according to an embodiment of the present invention, good results are obtained in respect of the ink bleeding, density non-uniformity in the solid region, and high image density, similarly to the direct recording method. Furthermore, good results were also obtained in respect of transfer characteristics, when using the ink set according to an embodiment of the present invention.

Furthermore, the influence of the pH differential between the ink and the treatment liquid on the ink bleeding, the density non-uniformity of the solid region, the image density and the transfer characteristics was also investigated.

Inks 7 and 8 that are the same as the ink 3 except for pH, were prepared (the inks 7 and 8 were prepared by changing the pH value of the ink 3). Treatment liquids 2 and 3 that are the same as the treatment liquid 1 except for pH, were prepared. The results of this assessment are shown in FIG. 6.

As shown in FIG. 6, if the pH differential between the ink and the treatment liquid is not less than 3.0 and not greater than 6.0, then good results were obtained in respect of all of the evaluation items, namely, the ink bleeding, density non-uniformity in solid regions, image density, and transfer characteristics.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An ink set comprising:
    a first liquid which contains a coloring material, a polymer, and a dispersion medium composed of water and water-soluble solvent, the coloring material and the polymer being dispersed in the dispersion medium, the coloring material having properties such that when dispersed in an aqueous coloring material solution, a volume-average particle size of the coloring material is changed along with a pH change of the aqueous coloring material solution, the polymer having properties such that when dispersed in an aqueous polymer solution, a volume-average particle size of the polymer is changed along with a pH change of the aqueous polymer solution; and
    a second liquid which changes pH of the first liquid,
    wherein a condition of $|\alpha-\beta 1| \geqq |\alpha-\beta 2|$ is satisfied,
    where $\alpha$ is pH of the first liquid before the first liquid is subjected to a pH change caused by the second liquid, $\beta 1$ is pH of the aqueous coloring material solution at which the volume-average particle size of the coloring material reaches 1000 nm along with the pH change of the aqueous coloring material solution, and β2 is pH of the aqueous polymer solution at which the volume-average particle size of the polymer reaches 1000 nm along with the pH change of the aqueous polymer solution.

2. The ink set as defined in claim 1, wherein:
the coloring material and the polymer contained in the first liquid form aggregate particles along with the pH change of the first liquid caused by the second liquid; and
when the pH of the first liquid becomes β1, the aggregate particles having diameters of not less than 500 nm account for not less than 80 vol % of all of the aggregate particles.

3. The ink set as defined in claim 1, wherein one of the first liquid and the second liquid is alkaline, and the other is acid.

4. The ink set as defined in claim 1, wherein a pH differential between the first liquid and the second liquid is not less than 3.0 and not greater than 6.0.

5. An image forming apparatus comprising:
a second liquid application unit which applies the second liquid of the ink set as defined in claim 1, on a recording medium; and
a first liquid application unit which applies the first liquid of the ink set as defined in claim 1, on the second liquid having been applied on the recording medium.

6. An image forming apparatus comprising:
a second liquid application unit which applies the second liquid of the ink set as defined in claim 1, on an intermediate transfer body;
a first liquid application unit which applies the first liquid of the ink set as defined in claim 1, on the second liquid having been applied on the intermediate transfer body; and
a transfer unit which transfers an image composed of the coloring material, from the intermediate transfer body to a recording medium.

7. An image forming method of forming an image on a recording medium, comprising the steps of:
applying the second liquid of the ink set as defined in claim 1, on the recording medium; and
then applying the first liquid of the ink set as defined in claim 1, on the second liquid having been applied on the recording medium, so that the coloring material and the polymer dispersed in the first liquid are subjected to aggregation to form the image on the recording medium.

8. An image forming method of forming an image on a recording medium, comprising the steps of:
applying the second liquid of the ink set as defined in claim 1, on an intermediate transfer body;
then applying the first liquid of the ink set as defined in claim 1, on the second liquid having been applied on the intermediate transfer body, so that the coloring material and the polymer in the first liquid are subjected to aggregation to form the image on the intermediate transfer body; and
then transferring the image from the intermediate transfer body to the recording medium.

* * * * *